(12) United States Patent
Bartlett et al.

(10) Patent No.: US 12,384,939 B1
(45) Date of Patent: Aug. 12, 2025

(54) KIRIGAMI-INSPIRED STRUCTURES FOR SMART ADHESION

(71) Applicant: Iowa State University Research Foundation, Inc., Ames, IA (US)

(72) Inventors: Michael Bartlett, Ames, IA (US); Dohgyu Hwang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1336 days.

(21) Appl. No.: 16/748,442

(22) Filed: Jan. 21, 2020

Related U.S. Application Data

(60) Provisional application No. 62/795,231, filed on Jan. 22, 2019.

(51) Int. Cl.
*C09J 7/20* (2018.01)
*C09J 7/29* (2018.01)

(52) U.S. Cl.
CPC ............... *C09J 7/29* (2018.01); *C09J 7/203* (2018.01); *C09J 2301/31* (2020.08)

(58) Field of Classification Search
CPC .......... C09J 7/29; C09J 7/203; C09J 2301/31
See application file for complete search history.

(56) References Cited

U.S. PATENT DOCUMENTS 3,741,786 A 6/1973 Torrey
4,001,366 A * 1/1977 Brumlik ............ A44B 18/0061
264/145

(Continued)

FOREIGN PATENT DOCUMENTS

WO 2017078987 A1 5/2017

OTHER PUBLICATIONS

[NPL-1] "How many uses does a diaper have at the barn?"; Pro Equine Grooms, Apr. 28, 2018; <https://proequinegrooms.com/tips/equipment-and-tack/the-many-uses-of-diapers-at-the-horse-barn/>. (Year: 2018).*

(Continued)

*Primary Examiner* — Donald M Flores, Jr.
(74) *Attorney, Agent, or Firm* — McKee, Voorhees & Sease, PLC

(57) ABSTRACT

Spatially controlled layouts of elasticity can provide enhanced adhesion over homogeneous systems. Here, kirigami-inspired structures at interfaces provide a new mechanism to spatially control and enhance adhesion strength while providing directional characteristics for smart interfaces. We use kirigami-inspired cuts to define stiff and compliant regions, where above a critical, material-defined length scale, bending rigidity and contact width can be tuned to enhance adhesive force capacity by a factor of ~100 across a spatially patterned adhesive sheet. The directional nature of these designs also imparts anisotropic responses, where peeling in different directions results in anisotropic adhesion ratios of ~10. The bending rigidity and contact width of kirigami-inspired structures and interconnects control the adhesive capacity. These new interfacial structures and design criteria provide diverse routes for advanced adhesive functionality, including spatially controlled systems, wearable kirigami-inspired electronics, and anisotropic kirigami-inspired bandages that enable strong adhesive capacity while maintaining easy release.

22 Claims, 36 Drawing Sheets
(33 of 36 Drawing Sheet(s) Filed in Color)

(56) References Cited

U.S. PATENT DOCUMENTS

| | | | |
|---|---|---|---|
| 4,749,432 | A | 6/1988 | Ando et al. |
| 4,889,234 | A | 12/1989 | Sorensen et al. |
| 5,650,215 | A | 7/1997 | Mazurek et al. |
| 6,159,584 | A * | 12/2000 | Eaton .................. A61F 13/5622 |
| | | | 442/398 |
| 6,187,432 | B1 | 2/2001 | Krish et al. |
| 6,756,102 | B1 | 6/2004 | Galo |
| 9,126,367 | B1 | 9/2015 | Mark et al. |
| 9,182,075 | B2 | 11/2015 | Crosby et al. |
| 9,395,038 | B2 | 7/2016 | Crosby et al. |
| 9,440,416 | B2 | 9/2016 | Crosby et al. |
| 9,574,113 | B2 | 2/2017 | Crosby et al. |
| 9,603,419 | B2 | 3/2017 | Crosby et al. |
| 9,630,359 | B2 * | 4/2017 | Rothwell ................ D01D 5/426 |
| 2004/0038061 | A1 | 2/2004 | Bargmann et al. |
| 2005/0084641 | A1 | 4/2005 | Downs et al. |
| 2006/0216451 | A1 | 9/2006 | Weiner et al. |
| 2009/0162595 | A1 | 6/2009 | Ko et al. |
| 2011/0151169 | A1 | 6/2011 | Maier et al. |
| 2016/0299270 | A1 * | 10/2016 | Kotov .................. G02B 5/1861 |
| 2021/0113213 | A1 * | 4/2021 | Dahl .......................... A61F 5/32 |

OTHER PUBLICATIONS

Gladman et la., "Biomimetic 4D printing", Nature Materials, vol. 15, pp. 413-419, Apr. 2016.

Hwang et al., "Kirigami-Inspired Structures for Smart Adhesion", ACS Applied Materials & Interfaces, vol. 10, 14 pages, Jan. 23, 2018.

Kendall, K., "Control of Cracks by Interfaces in Composites", Proceedings of the Royal Society, vol. 341, pp. 409-428, 1975.

Kendall, K., "Thin-film peeling—the elastic term", J. Phys. D: Appl. Phys., vol. 8, pp. 1449-1452, 1975.

Mohammed et al., "Modelling the interfacial peeling of pressure-sensitive adhesives", Journal of Non-Newtonian Fluid Mechanics, vol. 222, pp. 141-150, 2015.

Peng et al., "Peeling behavior of a thing-film on a corrugated surface", International Journal of Solids and Structures, vol. 60-61, pp. 60-65, 2015.

Xia et al., "Toughening and Asymmetry in Peeling of Heterogeneous Adhesives", PRL, vol. 108, 5 pages, May 11, 2012.

Xia et al., "Adhesion of heterogeneous thin films—I: Elastic heterogeneity", Journal of the Mechanics and Physics of Solids, vol. 61, pp. 838-851, 2013.

* cited by examiner

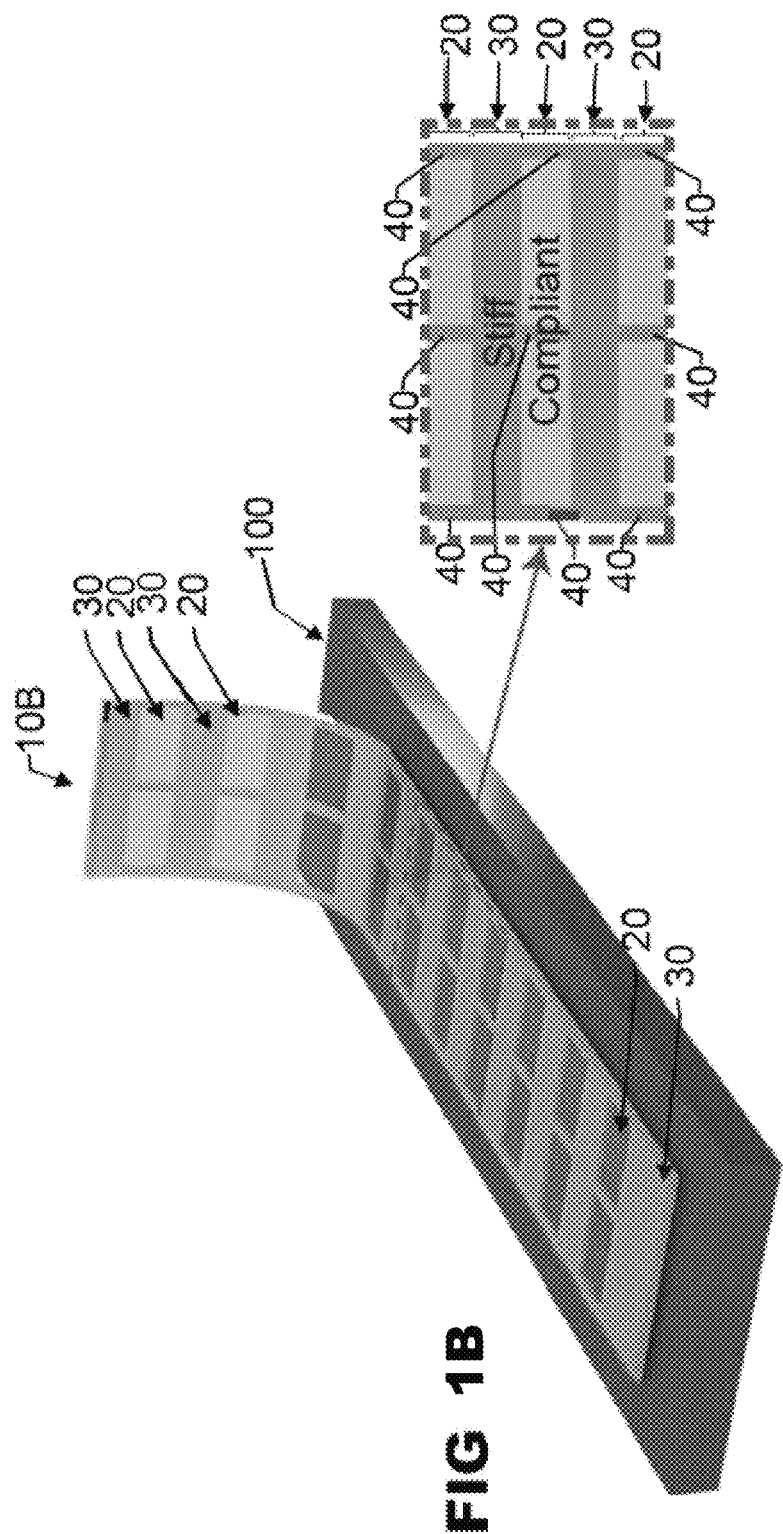

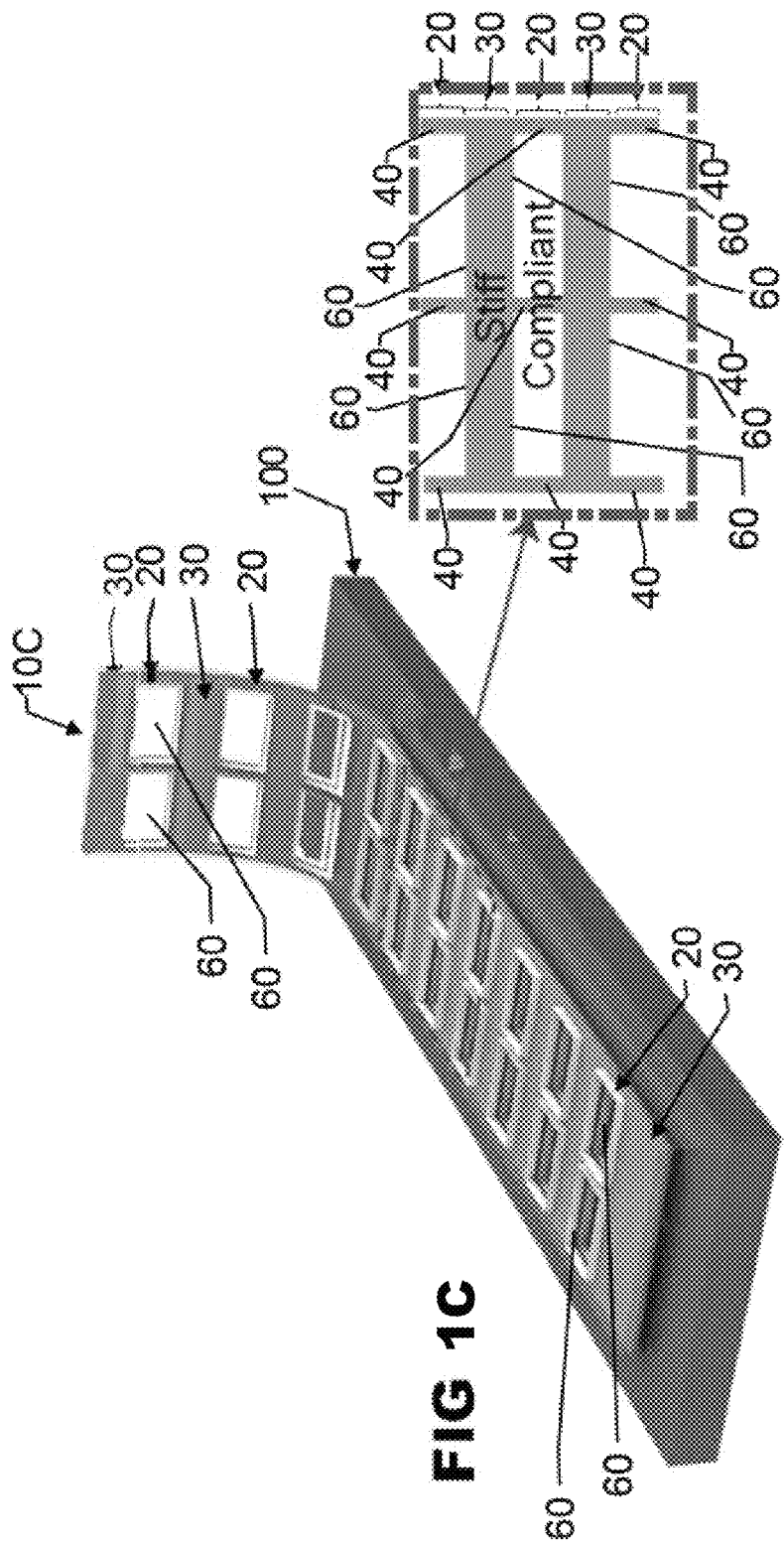

Table S1: Tensile modulus, tensile strength and strain at fracture of PDMS and PET dogbone samples.

|      | $E$           | $\sigma_f$         | $\varepsilon_f$   |
|------|---------------|--------------------|-------------------|
| PDMS | 880 ± 40 kPa  | 1.6 ± 0.4 MPa      | 202.0 ± 1.7 %     |
| PET  | 2.6 ± 0.1 GPa | 130.2 ± 1.3 MPa    | 90.5 ± 6.8 %      |

Fig. 8

KIRIGAMI-INSPIRED STRUCTURES FOR SMART ADHESION

CROSS-REFERENCE TO RELATED APPLICATIONS

This application claims the benefit of Provisional Application U. S. Ser. No. 62/795,231 filed on Jan. 22, 2019, which is herein incorporated by reference in its entirety.

I. BACKGROUND OF THE INVENTION

A. Field of the Invention

The present invention relates to sheet or film type structures with adhesive properties and, in particular, to fabricated structures that can be tuned for adhesive capacity and/or directionality relative to peel resistance.

Spatially controlled layouts of elasticity can provide enhanced adhesion over homogeneous systems. Emerging techniques in kirigami, where designed cuts in materials impart highly tunable stiffness and geometry, offer an intriguing approach to create well-defined layouts of prescribed elastic regions. Here, we show that kirigami-inspired structures at interfaces provide a new mechanism to spatially control and enhance adhesion strength while providing directional characteristics for smart interfaces. We use kirigami-inspired cuts to define stiff and compliant regions, where above a critical, material-defined length scale, bending rigidity and contact width can be tuned to enhance adhesive force capacity by a factor of ~100 across a spatially patterned adhesive sheet. The directional nature of these designs also imparts anisotropic responses, where peeling in different directions results in anisotropic adhesion ratios of ~10. Experimental results are well-supported by theoretical predictions in which the bending rigidity and contact width of kirigami-inspired structures and interconnects control the adhesive capacity. These new interfacial structures and design criteria provide diverse routes for advanced adhesive functionality, including spatially controlled systems, wearable kirigami-inspired electronics, and anisotropic kirigami-inspired bandages that enable strong adhesive capacity while maintaining easy release.

B. Problems in the State of the Art

Substantial work, including by the present inventors, is ongoing regarding this area of technology. The variety of factors involved with producing effective structures and properties, including factors that can be antagonistic with one another, presents challenges and unpredictability. This is borne out by the wide variety of approaches proposed in the state of the art. The inventors have identified room for improvement in the art.

The following patents are a few examples of approaches by others to adhesive tapes or films for background information, which are incorporated by reference herein:
- U.S. Pat. No. 3,741,786 to Torrey
- U.S. Pat. No. 4,749,432 to Ando et al.
- U.S. Pat. No. 4,889,234 to Sorensen et al.
- U.S. Pat. No. 5,650,215 to Mazurek et al.
- U.S. Pat. No. 6,187,432 to Krish et al.
- U.S. Pat. No. 6,756,102 to Galo
- US Published Patent Application 2004/0038061 to Bargmann et al.
- US Published Patent Application 2005/0084641 to Down et al.
- US Published Patent Application 2006/0216451 to Weiner et al.
- US Published Patent Application 2009/0162595 to Ko et al.
- US Published Patent Application 2011/0151169 to Maier et al.

The art of paper cutting, often known as kirigami and jiǎnzhǐ, can be applied to engineer materials with unique functional properties such as elastic softening, high extensibility, and the creation of complex 3D morphologies, through designed cuts.[1-5] Superscript numbers of this type refer to the bibliography, infra. This approach has been implemented to enhance the functionality of diverse material sets, leading to a spectrum of smart electronics and sensors.[6-12] Although there have been many reports on the mechanical behavior of kirigami structures and their potential functional applications, the influence of incisions or the complete removal of film materials at interfaces has not been well-explored. With the ability to tune mechanics and structure through cuts, kirigami-inspired designs offer a great potential to control adhesion and wetting through the precise control of interfacial properties.

Controlled and tunable adhesion is critical to a number of applications including biomedical systems, robotics, and manufacturing.[13-21] Conventionally, pressure-sensitive adhesives have been used to achieve high adhesive strength across an interface.[22] Although significant enhancement in adhesion can be attained through viscoelasticity,[23] these types of adhesives often display low reversibility, can leave behind undesirable residues through cohesive failure, and are particularly susceptible to degradation by particulate contamination. To overcome these constraints, works on reversible adhesives have focused on tuning interfacial geometry and elastic properties of materials. For example, micropillar arrays and carbon nanotubes with various tip geometries and aspect ratios have been studied to control the adhesive strength.[24-28] Adhesion control in these systems is typically associated with contact splitting mechanisms, where crack reinitiation, tunable stress concentrations, and adaptability to surfaces can lead to enhanced adhesion strength.[29-31] Although microstructured surfaces have been well-demonstrated to control adhesion, specialized equipment, complex procedures, and additional fabrication steps are typically required to achieve desirable performance.

In addition to fibrillar features, reversible adhesives have been developed by controlling the interfacial structure and stiffness. Interfacial structures such as directional discontinuities and wrinkles in elastomeric substrates have demonstrated the ability to alter crack paths when cracks encounter prescribed patterns.[32-35] Embedding surface microchannels filled with liquid or air enhance adhesion through dissipative effects when propagating cracks become trapped at the channels.[36,37] Controlling interfacial stiffness by integrating rigid fabrics into soft elastomers enables adhesives to create intimate contact over large areas, while maintaining stiffness to minimize strain energy and achieve high loads.[38,39] Patterning interfacial elasticity can allow for tunable adhesion, where changes in interfacial stiffness can allow for control of crack dynamics. This has been investigated through discrete regions of patterned stiffness across an interface, where the adhesion force can be tuned at stiffness transitions.[40,41] Although these studies investigated patterned rigidity, they focused on discrete patterns without interconnects and film continuity commonly observed in kirigami designs. All of the above-mentioned techniques have utilized interfacial structures to improve adhesive properties. However, systematic layouts of continuous films patterned by cuts, as seen in recent exploration of kirigami for engineering design, have been unexplored.

II. SUMMARY OF THE INVENTION

A. Objects, Features, and Advantages of the Invention

Here, we show that kirigami-inspired structures at interfaces provide a mechanism to spatially control and enhance adhesion strength while providing directional characteristics for high-capacity, easy-release interfaces. In several examples of the invention, Kirigami-inspired adhesives are created by introducing cuts through rapid laser machining into continuous adhesive films consisting of elastomeric interfaces supported by inextensible films. Although cutting films has been utilized in various art forms, we choose to describe the presented patterns as kirigami-inspired as we utilize repeating cut patterns in continuous films with interconnected structures, which are the characteristics of the kirigami design. We study the peel adhesion response of these systems by varying the interconnect structure and interfacial geometry. This approach introduces spatially varying regions of stiff and compliant regions which allow for the systematic tuning of bending rigidity and actual contact width. As cracks propagate through these regions, a material-defined characteristic length scale is found to dictate force enhancement, where above a critical length both bending rigidity and actual contact width can be tuned in stiff and compliant regions to enhance adhesive force capacity by a factor of ~100 across a sheet. The influence of interconnects on adhesion is further investigated, and as the number of interconnects increases, the adhesive force decreases and approaches that of a homogeneous strip as the bending rigidity contrast between stiff and compliant regions decreases. Furthermore, in examples of the invention we demonstrate the anisotropic properties of kirigami-inspired adhesives, where peeling along orthogonal directions results in anisotropic adhesive ratios of ~10. These experimental results are supported by theoretical predictions in which the bending rigidity and actual contact width of kirigami-inspired interconnects and structures are found to drive the adhesive capacity. This model well describes the experimental data and provides general design criteria for diverse kirigami-inspired adhesive structures. These structures and design criteria open new possibilities for advanced adhesive functionality, including spatially controlled systems, wearable electronics, and anisotropic bandages that enable strong adhesive capacity and easy release, which we demonstrate with a skin-mounted kirigami-inspired adhesive strip.

B. Aspects of the Invention

In a first aspect of the invention, an apparatus comprises a structure having adhesive properties. The structure includes spatially varied stiff and compliant regions along an axis or direction relative the overall structure. At least one interconnect bridges each compliant region between adjacent stiff regions. Adhesive capacity is enhanced by controlling stiffness in the axis or direction as well as actual contact width in the compliant regions. This can include resistance to peeling. Specific design parameters have been developed by the inventors to inform the designer as to such controls. In one example, a Kirigami-inspired continuous, more rigid layer has cut-outs. The cut-outs relate to the compliant regions and the material between the cut-outs the stiff regions. There is continuity of material at the margins of and/or bridging the cutouts which relate to the interconnects. In another example, stiff regions can start as independent material shapes and be positioned spaced apart from one another. The spaces between the shapes relate to compliant regions. One or more pieces of material can be affixed to and bridge adjacent shapes to relate to the interconnects. Non-limiting examples of affixation of an interconnect can be by sonic or thermal welding, adhesion, and mechanical fastening.

In another aspect of the invention, a product with tunable adhesive properties is created by a method which produces the stiff and compliant regions and interconnects.

In another aspect of the invention, a method of fabricating versions of the product can include a starting layer of inextensible film or sheet that is patterned with a series of closed and open regions, each bridged by at least one interconnect. The patterned layer is sandwiched between two elastic layers. The resulting trilayer structure presents spatially varying stiff and compliant regions along its length. By control of the patterning, control of stiffness and actual contact area is achieved. In one example, the patterned film is PET and is patterned by laser cutting, and the elastic layers are PDMS.

In another aspect of the invention, spatially-varied rigid and compliant regions are formed along a direction by alternating sections of discrete stiff and compliant regions and the shape and materials of each type of region are selected to control the bending rigidity along the direction. In one example, the spatially-separated stiff regions are encapsulated in a softer material which also forms the compliant regions between stiff regions. The encapsulating material can include reversable adhesive characteristics. In one example, this is inherent in the material itself (e.g. PDMS). In another example, the material can have its surface modified (physically and/or chemically) to promote the adhesive characteristic, or a coating or additional layer adding that has adhesive characteristic.

These and other objects, features, advantages and aspects of the invention will become more apparent with the accompanying specification.

III. BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will be made in this description to the appended drawings which are summarized below.

FIGS. 1A-C, 2A-D, 3A-C, 4A-F, and 5A-C are diagrams, graphs, and photos that illustrate various features and proof of concept of the invention.

In particular, FIGS. 1A-C are schematics of kirigami-inspired adhesives, which consist of alternating stiff and compliant regions, under 90° peel loading. FIG. 1A shows compliant region of model A is continuous, whereas FIG. 1B shows model B incorporates 18 rigid interconnects on the continuous layer and FIG. 1C shows model C consists of interconnects supported by an adhesive with voids between interconnects. FIG. 1D is a representative normalized peel force vs displacement plot for each model.

In particular, FIG. 2A is schematics of a kirigami-inspired adhesive with geometric parameters and different designs. For models A and B, $w_c = w_s$, while the voids between interconnects in model C results in $w_{c,modelC}$ being equal to the sum of the widths of individual interconnects $w_{int}$ such that $$w_{c,model\ C} = \sum_{j=1}^{N} w_{int,j},$$

where N is the number of interconnects in the compliant region (N=3 and w int=2 mm for the data presented in the figure). FIG. 2B is a plot of relative displacement ($\delta_{relative}$) of the three adhesive models vs substrate displacement ($\delta$). $\delta_{relative}$ is measured with respect to the position of the peel front of a homogeneous adhesive. Data points below zero in model C are absent because of the void areas when the peel front crosses the compliant interface. FIG. 2C is a plot of normalized peak force of each model vs length of the stiff region $l_s$. FIG. 2D is a bar chart illustrating the adhesion enhancement ratio ($F_s/F_c$) as a function of $l_s$.

In particular, FIG. 3A is a xchematic diagram showing a varying number of interconnects in the compliant region. FIG. 3B shows normalized peel force $F_{peel}/w_s$ vs displacement plot for model B with varying number of interconnects. FIG. 3C shows relative adhesion force of systems with multiple interconnects over a structure with a single interconnect ($F_{s,N=i}/F_{s,N=1}$) as a function of the number of interconnects. The black dashed line indicates the value of a homogeneous adhesive. The inset shows the adhesion enhancement ratio $F_s/F_c$ as a function of $E_s I_s w_s / E_c I_c w_c$, where the colors match the legend in component b.

In particular, FIG. 4A is a xchematic diagram of a model C adhesive and a directionally reconfigured adhesive. FIG. 4B shows a $F_{peel}$ vs displacement plot for a model C and reconfigured adhesive. FIG. 4C is an $F_s$ and FIG. 4D is an adhesion enhancement ratio ($F_s/F_c$) for model C and the reconfigured model. $l_s$=8 mm for components a-d. FIG. 4E is $F_s$ vs $l_s/l_{ch,s}$, where $l_s$ is varied from 2 to 20 mm. FIG. 4F is an adhesion anisotropy ratio ($F_{s,C}/F_{s,R}$) vs $l_s/l_{ch,s}$, where the lines are the predictions from eq 2 with the specified a values and the blue shading represents the region within these limits. Gray regions in e and f represent regions, where $l_s/l_{ch,s}<1$. All adhesives within the figure have three interconnects (N=3).

In particular, FIG. 5A is a log-log plot of the adhesion enhancement ratio ($F_s/F_c$) vs the contrast in bending stiffness and width ($E_s I_s w_s / E_c I_c w_c$), where the solid line is the prediction from eq 1. FIG. 5B is a log-log plot of the enhancement ratio in the work of adhesion vs $E_s I_s w_s / E_c I_c w_c$, the solid line is an empirical fit with y=1/4x+3/4. In both figures, data points that do not meet the length criterion $l_s > l_{ch,s}$ are excluded. FIG. 5C is a photograph of a kirigami-inspired adhesive peeling off from an arm.

26 In particular, FIG. 5D is an illustration of an exemplary embodiment according to aspects of the present invention partially adhered to a substrate (showing flexible or inflexible alternatives) and diagrammatically illustrating by the graph its adhesive properties depending on peeling direction. Specifically, this version 10D of an adhesive structure has a plurality of layers including a top layer 50, bottom layer 70, and an intermediate layer 71 therebetween (could be one or more or none). Bottom layer 70 is an adhesive interface. In this example each compliant region along the length of structure 10D has two rectangular openings 60 formed/cut through the entire thickness of the structure 10D (e.g. through layers 50, 71, and 70), framed by three interconnects 40 (one at each lateral margin of structure 10D and one at or near the middle. Rigid regions separate each compliant region along the length. It therefore has different bending stiffness at different locations along its length. As indicated, the adhesive interface 70 can be applied to a wide variety of surfaces. Here two examples are shown. A rigid substrate 100 (bottom) or a flexible substrate, e.g., skin, fabric, paper, etc. (top left). As illustrated, structure 10D presents much higher resistance to removal at in peel direction 77 (see peel force 78' in graph) and much less (see peel force 77' in the graph) in peel direction 76. Although peel force 78' has large peaks related to the structure of structure 10D, the result is significant resistance to peel off in the longitudinal direction 77 of structure 10D. On the other hand, it makes for relatively easy removal, if desired, by manually peeling off in the lateral direction 76. As will be appreciated, the designer can vary the number of layers and the form factors of the layers, openings and interconnects, materials using the principles discussed herein according to need or desire for various applications. Once applied to a substrate, it is far easier to remove by peeling laterally than longitudinally.

FIG. 6A is three sets of photographs of kirigami-inspired adhesives each frame showing a series of times (i), (ii), and (iii) under a 90° peel test (left column=Model A, center 19 column=Model B, right column=Model C). Red solid lines indicate the position of the peel front and black dashed lines indicate the position of the peel front in a homogeneous adhesive. (Scale bar=30 mm).

FIGS. 6B-J are enlargements of individual frames of FIG. 6A.

FIG. 8 is a table showing tensile modulus, tensile strength and strain at fracture of PDMS and PET dogbone samples according to aspects of the invention.

IV. DETAILED DESCRIPTION OF EXEMPLARY EMBODIMENTS OF THE INVENTION

A. Overview

Figure 1A:
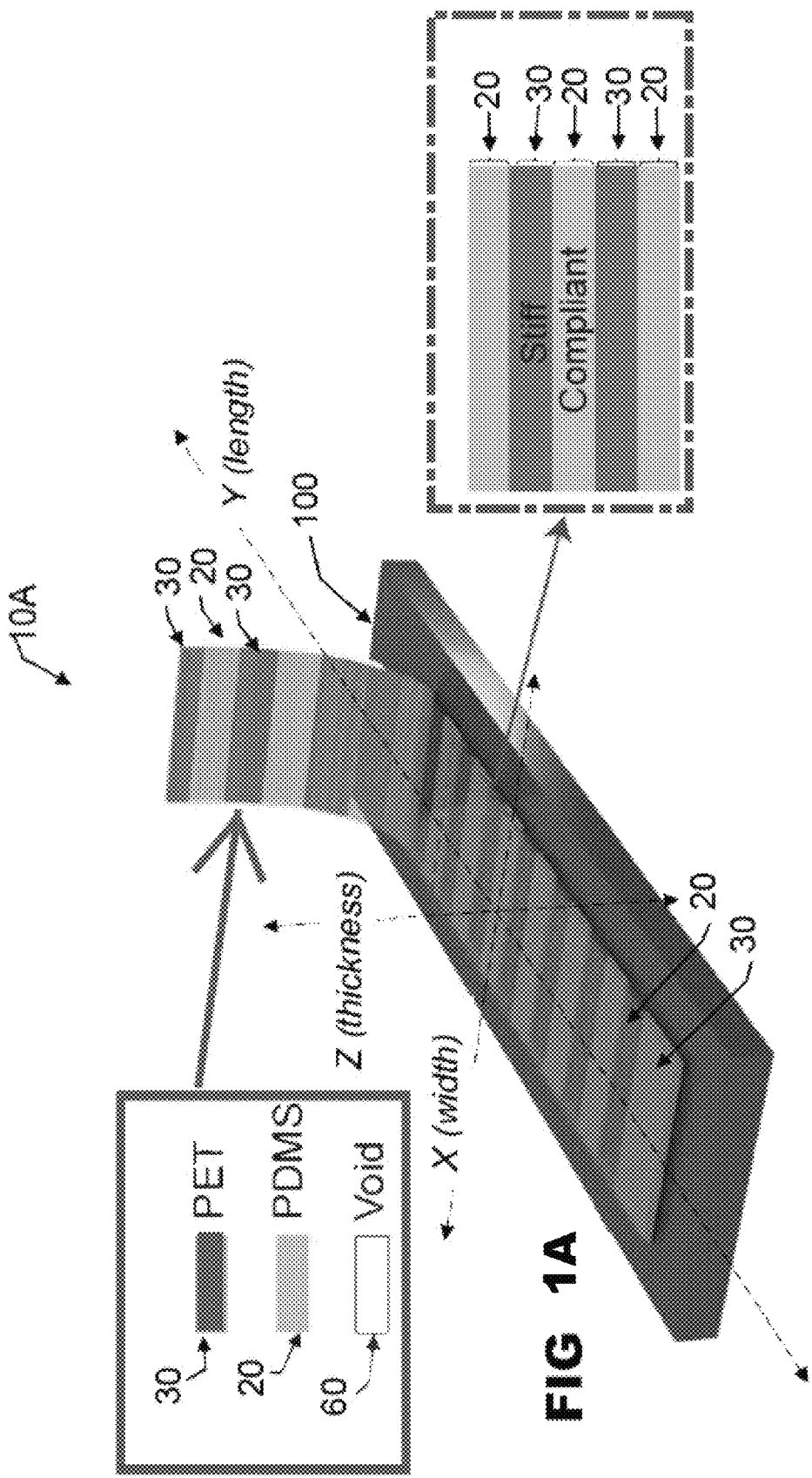

To assist in an understanding of the invention, examples of some forms and aspects it can take will now be set forth in detail. It is to be understood these examples are neither exclusive nor inclusive of all forms and embodiments the invention can take.

For example, the examples will be illustrated with fabricated embodiments of elongated shape with lengths of inches, width of less than that, and thicknesses of even less. The scale can, of course, vary. Specific materials are referenced in the examples. Those materials can vary.

B. Generalized Example

1. Method

A method of providing a sheet or film type structure with tunable adhesive properties includes the following primary feature:
  a series of more rigid and more compliant regions along an axis or direction of
  the structure where the characteristics of the more rigid and more compliant regions can be tuned to optimize adhesive properties or engineer adhesive properties according to need or desire.

The method includes control of materials, shape, length, width, and thickness of rigid and compliant regions both individually and in relation to each other. Design criteria disclosed herein provides such control variations for a designer. The criteria can be used to enhance both adhesive capacity of the final structure but also directionality in resistance to peeling. The discussion herein gives examples of specific ways to facilitate the method. In one example, the rigid and more compliant regions are more inextensible versus more elastic or open portions of the overall structure. They can be produced by subtractive or additive fabrication techniques.

Another aspect of the invention comprises a method of providing a sheet or film type structure with tunable adhesive properties includes the following primary features:
  a. a series of more rigid and more compliant regions along an axis or direction of the structure; and
  b. at last on interconnect bridging each compliant region between adjacent rigid regions.

The characteristics of the more rigid and more compliant regions can be tuned to optimize adhesive properties or engineer adhesive properties according to need or desire. Kirigami-inspired cuts in a continuous sheet or layer of material can be used to effectively and efficiently form the basis for the compliant and rigid regions in the final overall structure.

Another method uses a series of spatially separated, discrete rigid or stiff sections along the direction separated by compliant sections, all combined in a sheet or film like structure. The characteristic length scale can be designed in both the stiff and compliant sections to enhance adhesive force capacity across the sheet even without interconnects.

In a further aspect, at least one interconnect of stiff material connects adjacent stiff sections. The method includes control of shape, length, width, and thickness of interconnects, as well as position and number.

2. Apparatus

At a general level, an apparatus according to the invention has attributes as discussed above. A structure includes spatially varying stiff and compliant regions. In one specific example, the varying regions comprise more inextensible versus more elastic or even open areas. In a further aspect, at least one interconnect of stiff material connects adjacent stiff sections.

3. System and Operation/Applications

The discussion herein includes some examples of applications for the structure produced by the method above. The non-limiting examples include bandages, wearable patches, and wearable smart circuits.

C. Specific Example

The following provides specific examples of forms, aspects, and embodiments according to the invention. This information is from Doh-Gyu Hwang, Katie Trent, and Michael D. Bartlett, Kirigami-Inspired Structures for Smart Adhesion, *ACS Appl. Mater. Interfaces*, 2018, 10 (7), pp 6747-6754 and its Supplemental Information available free of charge on the American Chemical Society (ACS) Publications website at DOI: 10.1021/acsami.7b18594, entitled "Peel adhesion images and mechanical characterization of materials"; both of which are incorporated by reference herein.

1. RESULTS AND DISCUSSION

Three different adhesive designs are created to investigate the effect of kirigami-inspired structures on peel adhesion (FIGS. 1A-C). Such structures will be referred to generally with reference number 10, but sometimes, to differentiate between several specific example designs called Models A, B, and C, Model A will be referred to by reference number 10A, Model B by 10B, and Model C by 10C. Each design 10 consists of alternating stiff and compliant regions of equal thickness, which are made of an adhesive layer and encapsulation layer of polydimethylsiloxane (PDMS) (E=880±40 kPa) separated by an inextensible polyethylene terephthalate (PET) strip (E=2.6±0.1 GPa). A general coordinate system X (transverse axis or width), Y (longitudinal axis or length), Z (thickness) is diagrammatically illustrated in FIG. 1A for reference. Stiff regions will be generally indicated at reference number 30. Compliant regions generally at reference number 20. In both regions, PDMS serves as the adhesive layer. Model A consists of alternating sections of discrete stiff and compliant regions 30 and 20 along the length (Y-axis) of structure 10, where the PET sheet is absent in the compliant region. Model B introduces stiff interconnects 40, which bridge across the compliant regions to connect the stiff regions 30. Model C is designed by eliminating the PDMS regions between interconnects 40 in the compliant regions 20, creating an open structure or void (see generally reference numbers 60). Initially, there are three interconnects 40, one at each edge of structures 10B and 10C and another in the center of the strip 10B and 10C. The adhesive strips 10A, 10B, and 10C are examined with 90° peel adhesion measurements (relative to surface or substrate 100), where the interfacial crack propagates through the alternating compliant/stiff regions 20/30.

Figure 1D:
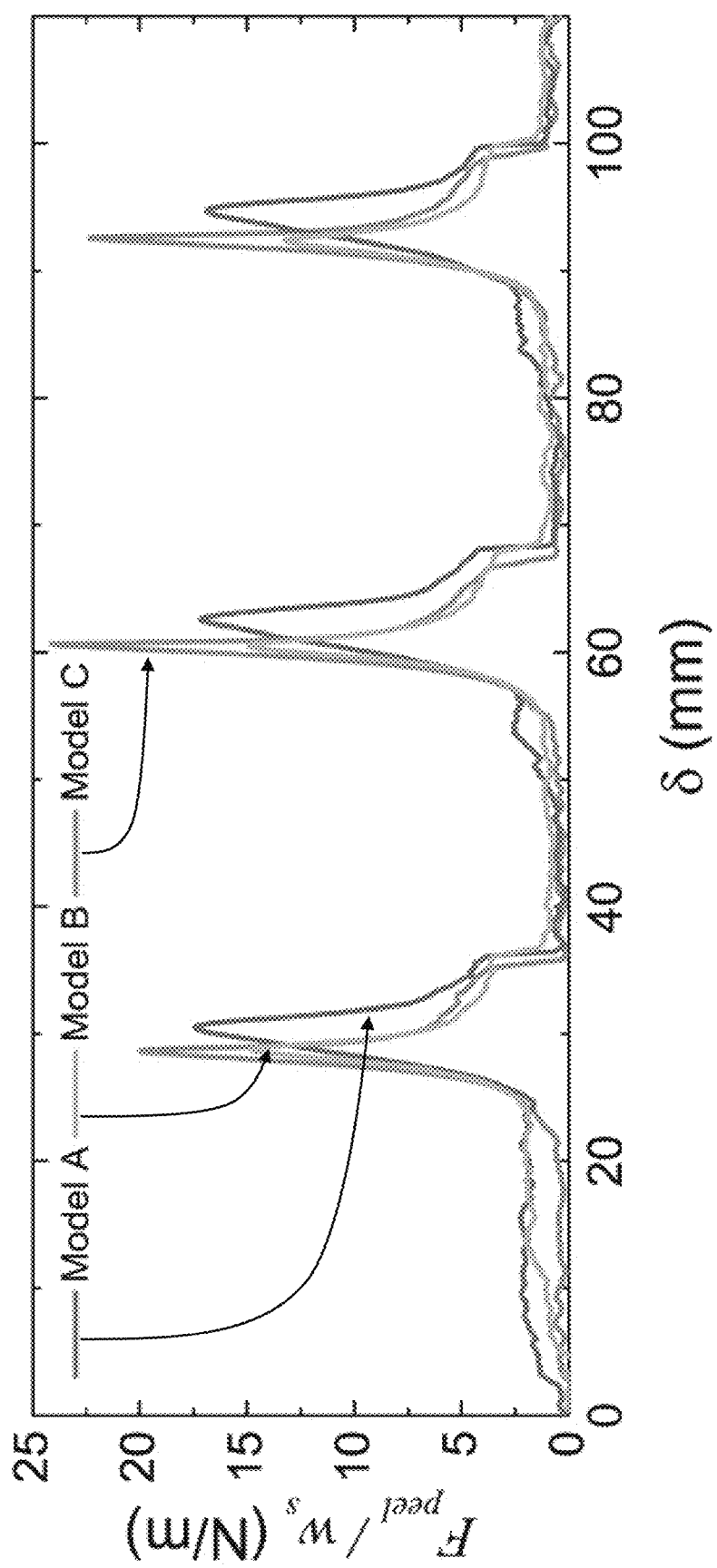
Figure 2A:
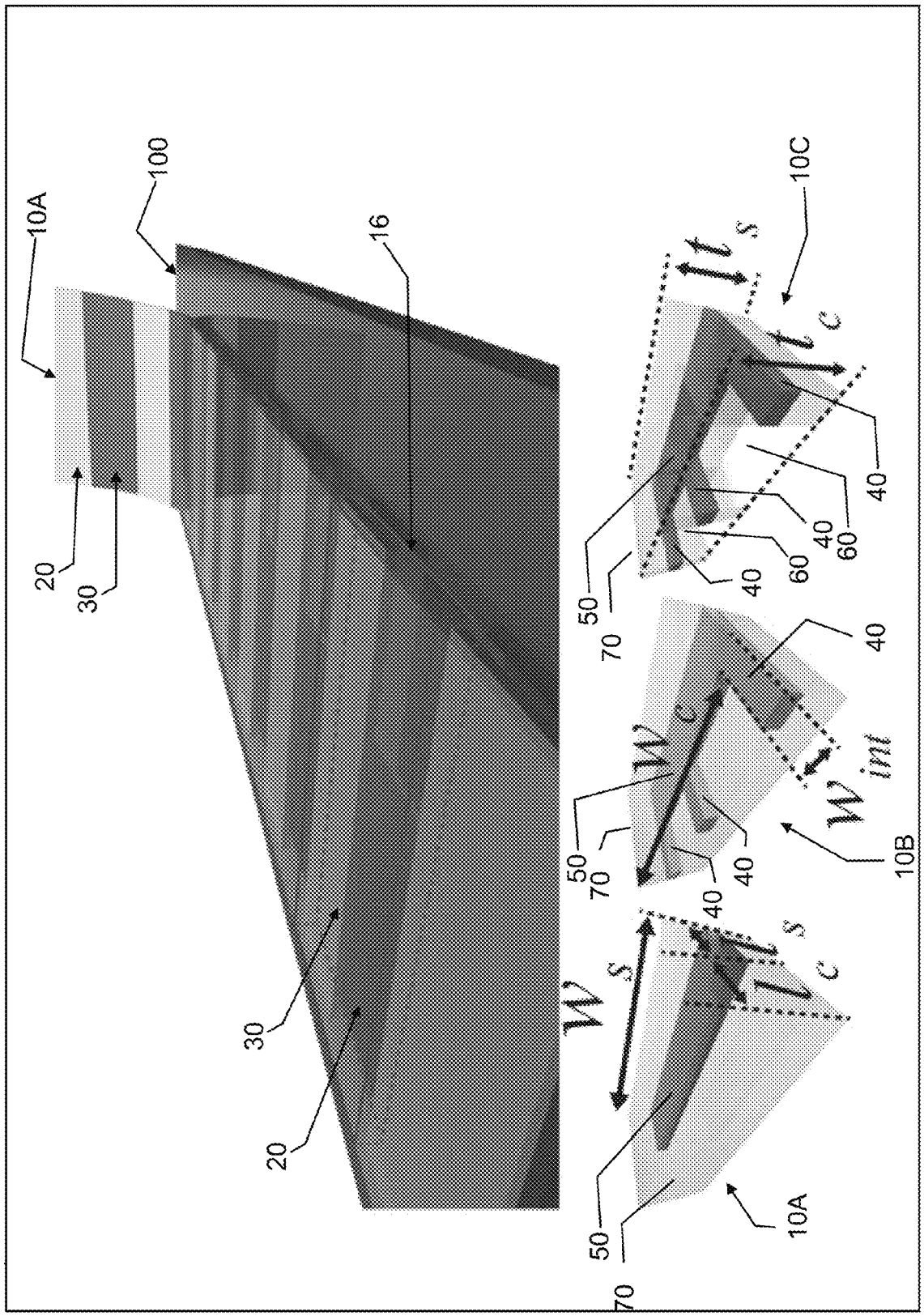
Figure 2B:
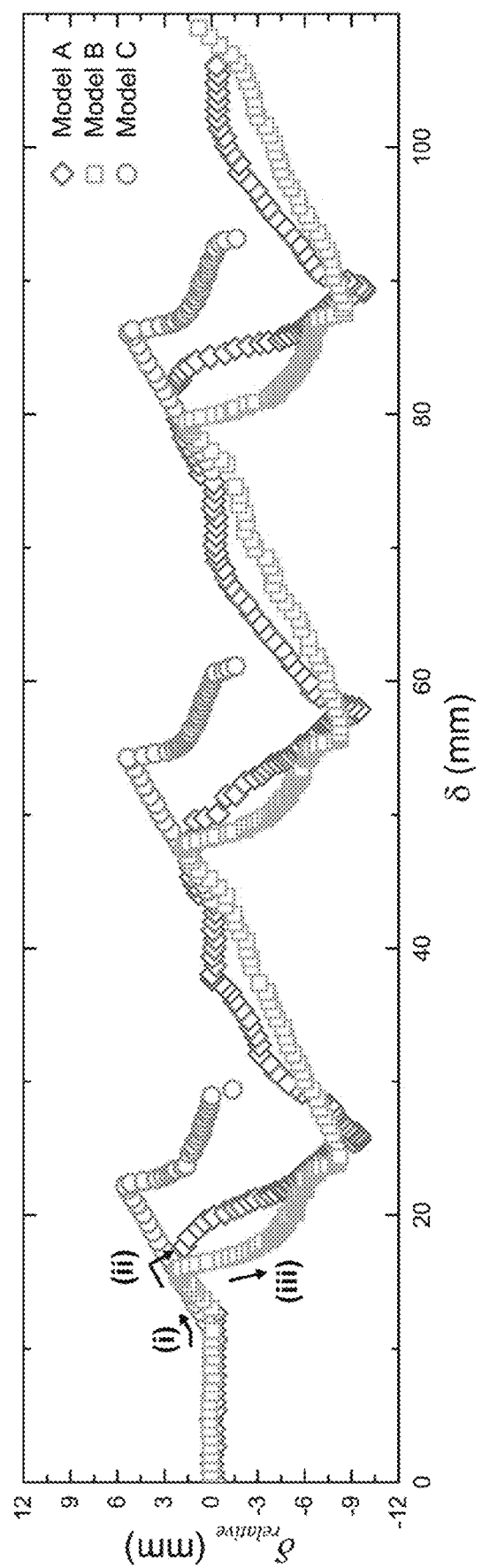

FIG. 1D shows representative normalized peel force-displacement curves for each model 10A, 10B, and 10C. Although the geometry of the stiff region 30 is identical in all three models, the addition of interconnects 40 (model B or 10B) or further removal of PDMS in the compliant region 20 (model C or 10C) influences the peak force. Relative to model A (or 10A), the average peak force achieved in model B decreases by over 15%, whereas the average peak force in model C increases by over 30%. The structure of the interface is also observed to alter the crack propagation behavior. The interface is between one side or surface of structure 10A, 10B, or 10C and another surface (generally indicated at reference number 100). As will be appreciated surface 100 can be any of a wide variety of surfaces or objects. Non-limiting examples include a smooth rigid surface (e.g. acrylic), flexible surfaces (e.g. clothing, skin), porous, smooth, soft, etc. In FIG. 2B, we plot the relative displacement $\delta_{relative}$ of the peel front versus the absolute displacement $\delta$ of the substrate, where $\delta_{relative}$ is the distance between the position of the peel line on the kirigami-inspired adhesive and a homogenous adhesive (see FIGS. 6a-j for images, where, for comparison purposes, superposed (black) dashed line 80 generally represents the peel front in a homogenous adhesive and superposed solid (red) line 81 generally represents the position of the peel front of the kirigami-inspired structure 10 during different stages of peeling for each model 10A, 10B, and 10C). Initially, $\delta_{relative}$=0 for all models 10A, 10B, and 10C; however, as the peel line 81 reaches the stiff region 30 the crack decelerates, as demonstrated by an increase in $\delta_{relative}$, and gets trapped at the stiff interface (zone i and ii in FIG. 2B). Further displacement results in sudden interfacial failure, where the crack is accelerated and $\delta_{relative}$ decreases (zone iii in FIG. 2B). Here, we see that model C or 10C shows the most significant crack trapping, as the crack not only approaches a discontinuity in stiffness but must also reinitiate at the stiff interface.

To quantitatively explain the adhesion enhancement of kirigami-inspired adhesives, we follow a fracture mechanics energy balance approach. For a homogeneous adhesive strip under 90° peel loading, the crack propagates with a steady-state peel force with $F_{peel}=WG_c$, where w is the strip width and $G_c$ is the critical strain energy release rate for the interfacial fracture.[42] However, for a heterogeneous strip 10 according to aspects of the present invention, the peel force in the compliant region 20 ($F_c$) and stiff region 30 ($F_s$) varies as the crack propagates into the interface between these regions 20 and 30. This interface modifies the shape of the bent adhesive strip 10, which changes the mechanical energy in the system.[40,43] The change in shape depends on the bending rigidity (EI) of the two regions 20 and 30, where E is the elastic modulus and I is the second moment of area. Additionally, for the case of kirigami-inspired adhesives, the actual contact width changes as the crack travels across the interface from $w_c$ to $w_s$. In this framework, the effective adhesion enhancement ratio of the peel force is calculated by considering the variation of total energy such that $$\frac{F_s}{F_c} = \frac{E_s J_s w_s}{E_c I_c w_c} \quad (1)$$

where the subscripts s and c denote the stiff and compliant terms, respectively. Equation 1 shows that the enhancement ratio of kirigami-inspired adhesives is controlled by the difference in bending stiffness EI and actual contact width w in both regions 20 and 30.

To optimally design kirigami-inspired adhesives, the relative size and geometry of the stiff and compliant regions 20 and 30 need to be controlled. We consider the heterogeneous kirigami-inspired adhesive as a repeating array of unit cells each cell 16 with a compliant and a stiff region 20 and 30 (FIG. 2A). The stiff region 30 is characterized by width $w_s$, length $l_s$, and thickness $t_s$, which in this example comprises a PET sheet $t_{PET}$ and two encapsulating PDMS layers tPDMS. The width and thickness of the stiff region 30 are constant throughout the experiment ($w_s$=46 mm, $t_s$=0.75±0.1 mm). The length $l_s$=2, 4, 8, 12, and 20 mm is selected based on the characteristic length of the stiff region $$\left( l_{ch,c} = \sqrt{\frac{2 E_c I_c}{w G_c}} \approx 6.4 \text{ mm} \right)$$

where the characteristic length $l_{ch}$ is a length scale comparable to the dimension of the stress field at the peel front.[43] If $l_s$ is smaller than $l_{ch,s}$, the peel front propagates from a compliant region 20 to a stiff region 30 without fully undergoing the crack-arresting effect, which reduces adhesion enhancement. The compliant region 20 is characterized by width $w_c$, length $l_c$, and thickness the in the same manner. The length and thickness of the compliant region 20 are constant throughout the experiment ($l_c$=12 mm, $t_c$=$t_s$), where $l_c$ is greater than the characteristic length of the compliant region $$\left( l_{ch,c} = \sqrt{\frac{E_c I_c}{E_s I_s}} l_{ch,s} \approx 2 \text{ mm} \right)^{43}.$$

The width $w_c$ is constant for models A and B (=46 mm), whereas $w_c$ varies in model C as $$w_{c,modelC} = \sum_{j=1}^{N} w_{int,j},$$

where N(=3) is the number of interconnects 40 and $w_{int}$ (=2 mm) is the interconnect width.

Figure 2C:
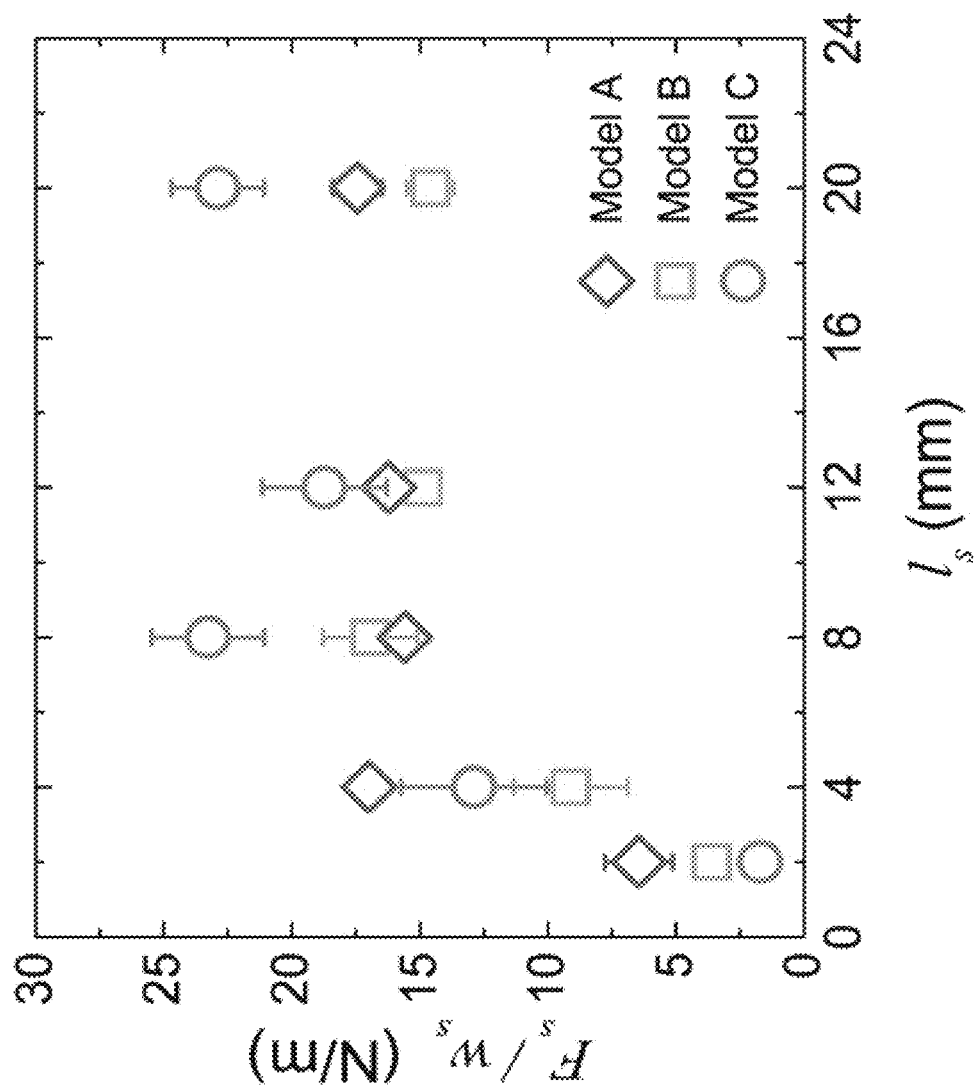
Figure 2D:
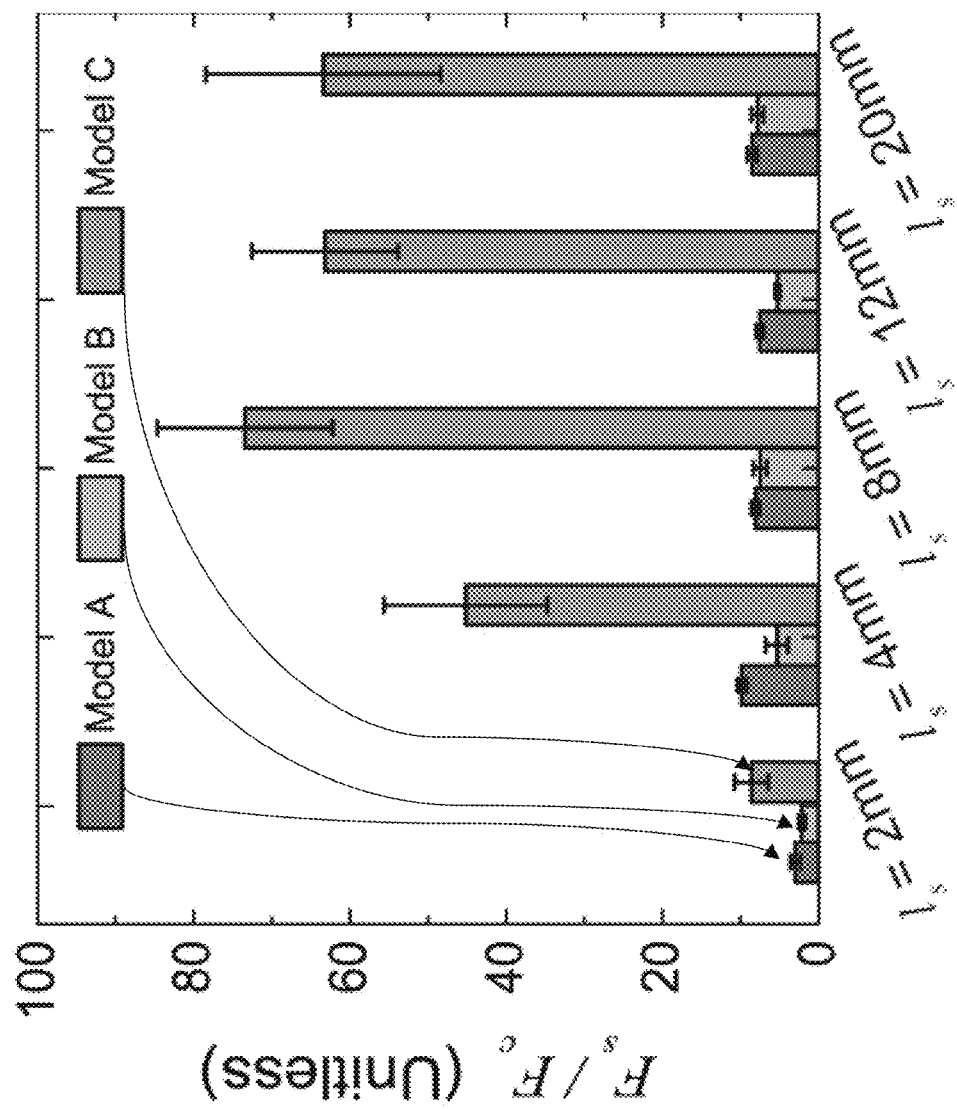

FIG. 2C illustrates the normalized peak force of the stiff region 30 for each model 10A, 10B, and 10C as a function of the length of the stiff region 30. In general, adhesives with shorter $l_s$ (=2, 4 mm) than $l_{ch,s}$ in the stiff region 30 show a reduced enhancement because the peel front travels across the region 30 with partial crack arrest. In contrast, the peak force is fully enhanced across a stiff interface for systems with larger $l_s$ (=8, 12, 20 mm) than $l_{ch,s}$ in the stiff region 30, and the value is relatively constant regardless of the length of the stiff region 30. FIG. 2D shows the adhesion enhancement ratio ($F_s/F_c$) obtained by dividing the peak force in the stiff region 30 by the force in the compliant region 20. When model C meets the criterion $l_s > l_{ch,s}$, the adhesion enhancement ratio increases to 60-70, greatly exceeding other models. Importantly, the significant enhancement in model C is not only due to the variation in stiffness but also attributed to the reduced actual contact width in the compliant region 20. This influence is important for the design of kirigami-inspired adhesives, as cut geometries can be generated to tune adhesion through both heterogeneous stiffness and actual contact width, expanding design space beyond patterned stiffness alone.

Figure 3A:
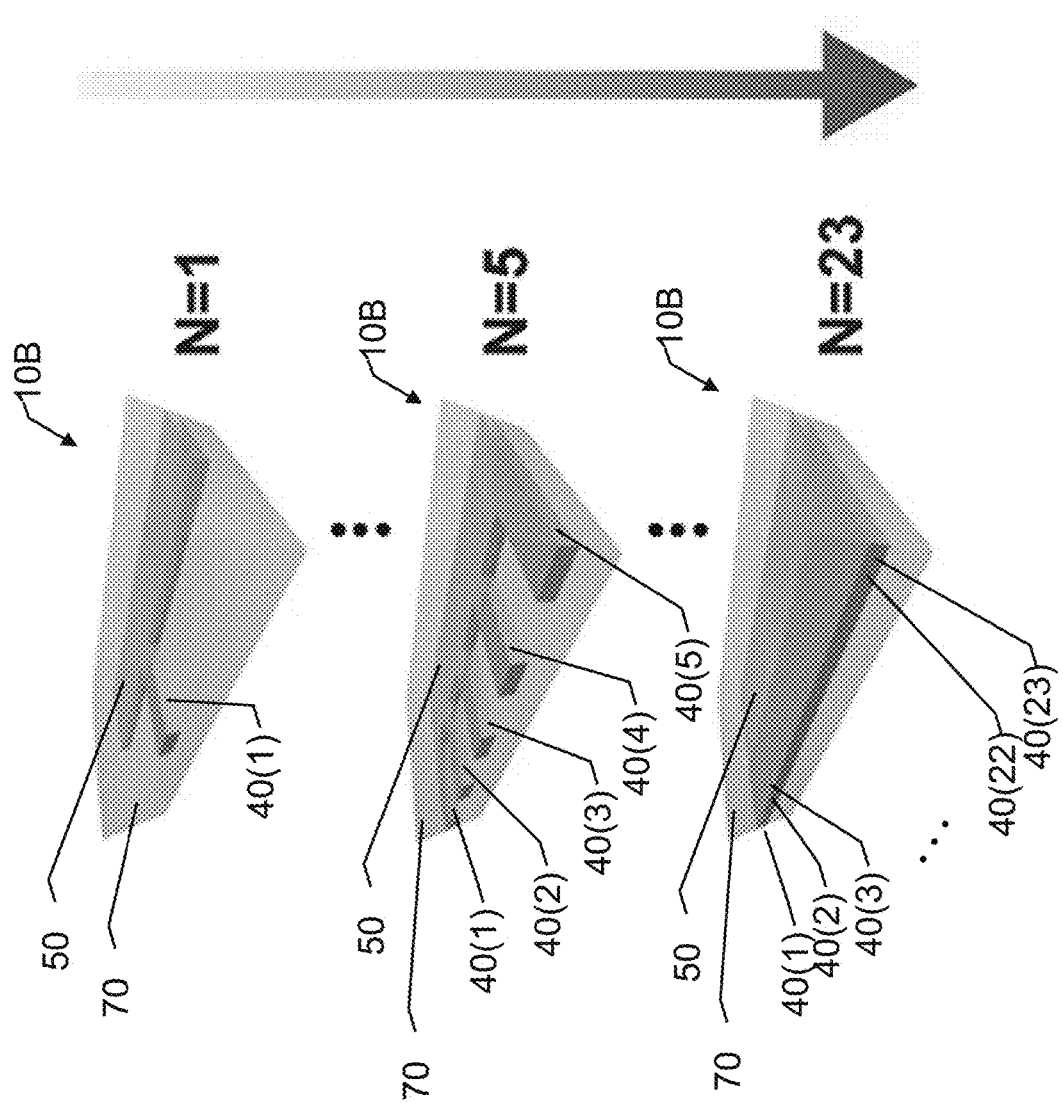
Figure 3B:
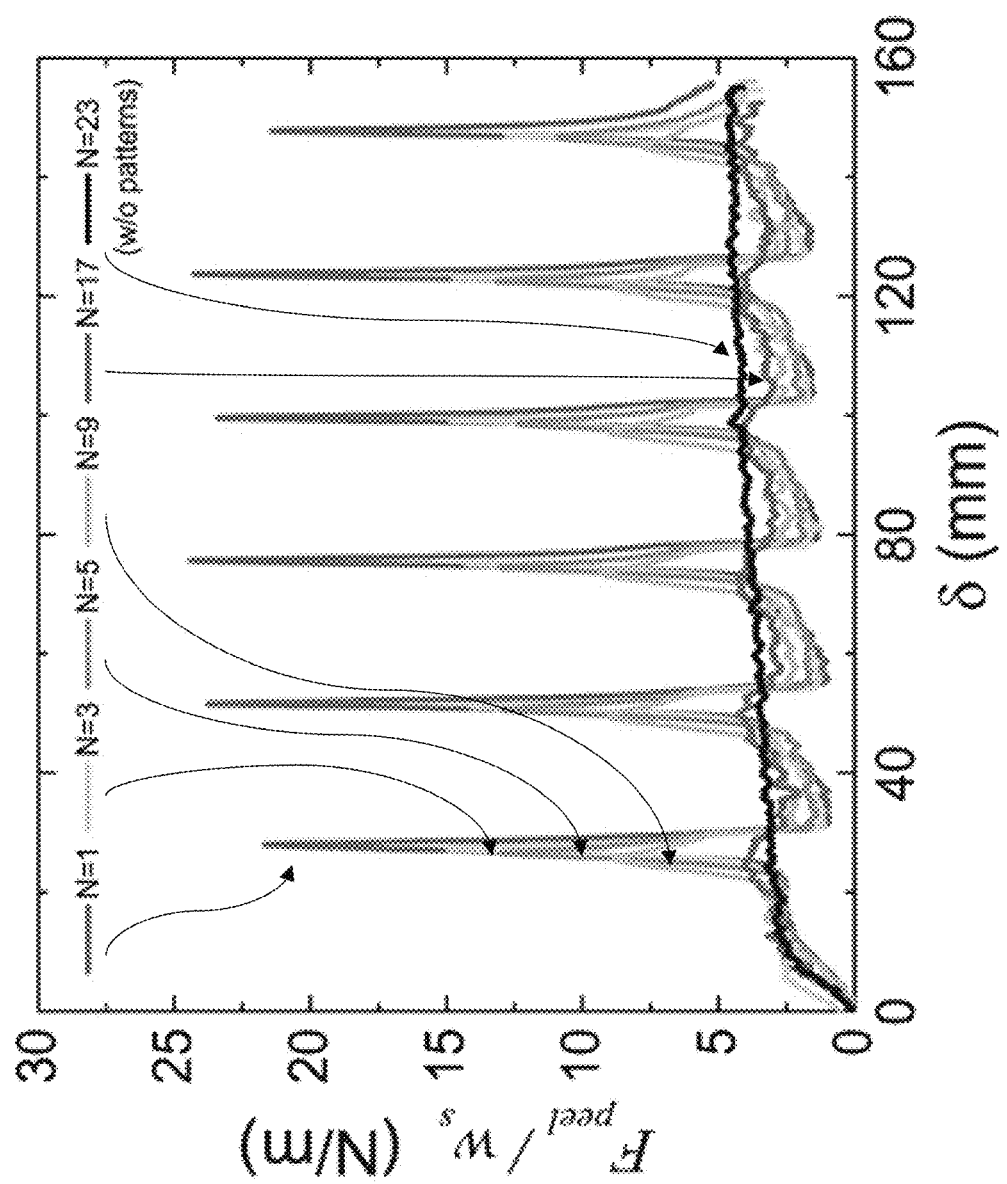
Figure 3C:
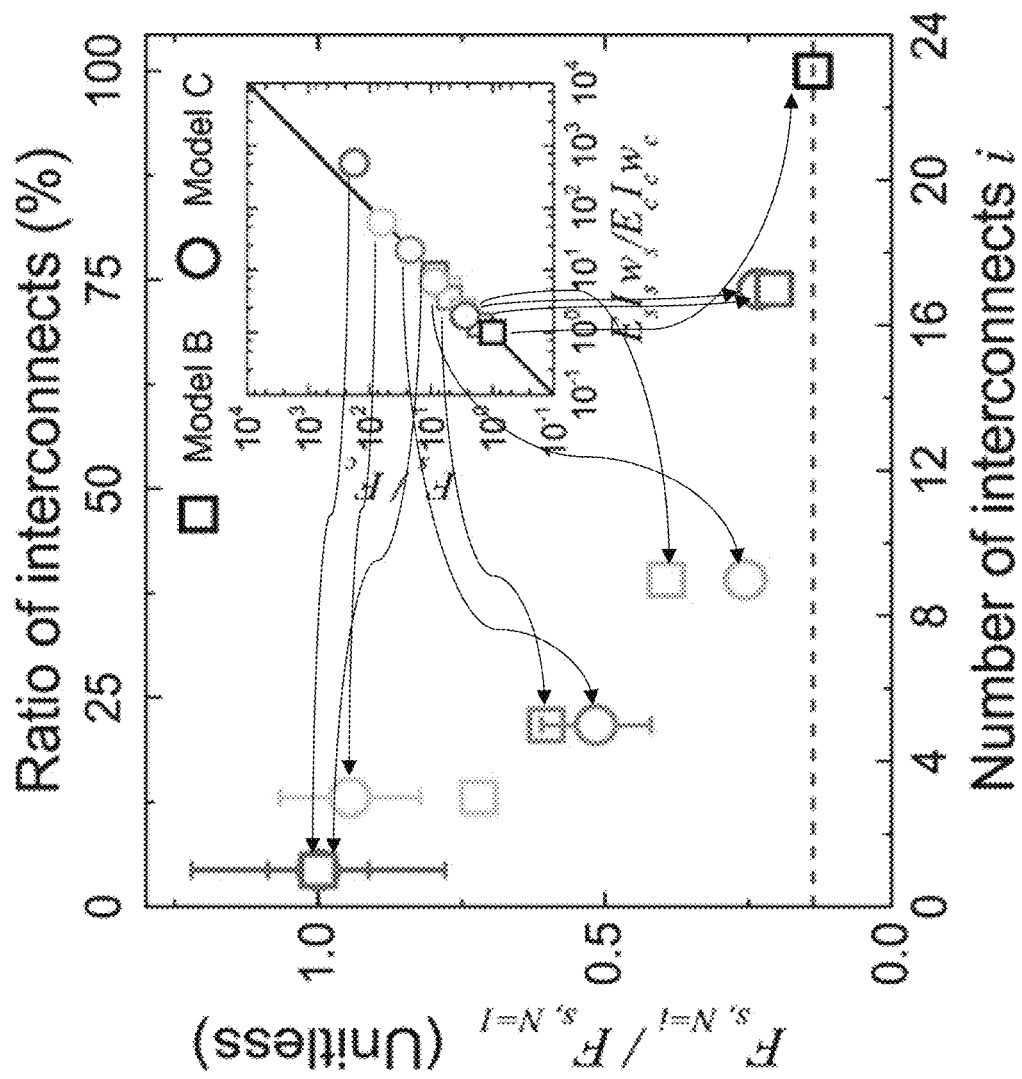

The role of interconnects on adhesion enhancement is further investigated by varying the number (N) of interconnects 40 between 1 and 23 (as illustrated in FIG. 3A—note that the twenty-three interconnects 40 are illustrated diagrammatically as a solid traverse section for simplicity, but there were twenty-three interconnects 40 of generally equal width and spacing). The width of interconnects $w_{int}$ (=2 mm) and the stiff region $w_s$ (=46 mm) are constant throughout the experiments, and the patterned system is equal to a homogeneous adhesive when N=23. The normalized peel force versus displacement plot in FIG. 3B shows that as the number of interconnects 40 increases, $F_{peel}/w_s$ systematically decreases. When the adhesive strip 10 becomes homogeneous (N=23), the peel force becomes steady and no longer displays a spatially varying adhesive force. FIG. 3C shows a plot of the normalized peak force with a varying number of interconnects 40 ($F_{s,N=i}$) over that of a sample with a single interconnect 40 ($F_{s,N=1}$) as a function of the number of interconnects 40(1) to 40(n). Here, we see that increasing the number of stiff interconnects 40 in the compliant region 20 results in reduced crack-trapping effects and a reduced peak adhesive force. This can be explained in the context of eq 1, where additional interconnects 40 in the compliant region 20 increase the bending rigidity, reducing the adhesion enhancement ratio (FIG. 3C inset).

Figure 4A:
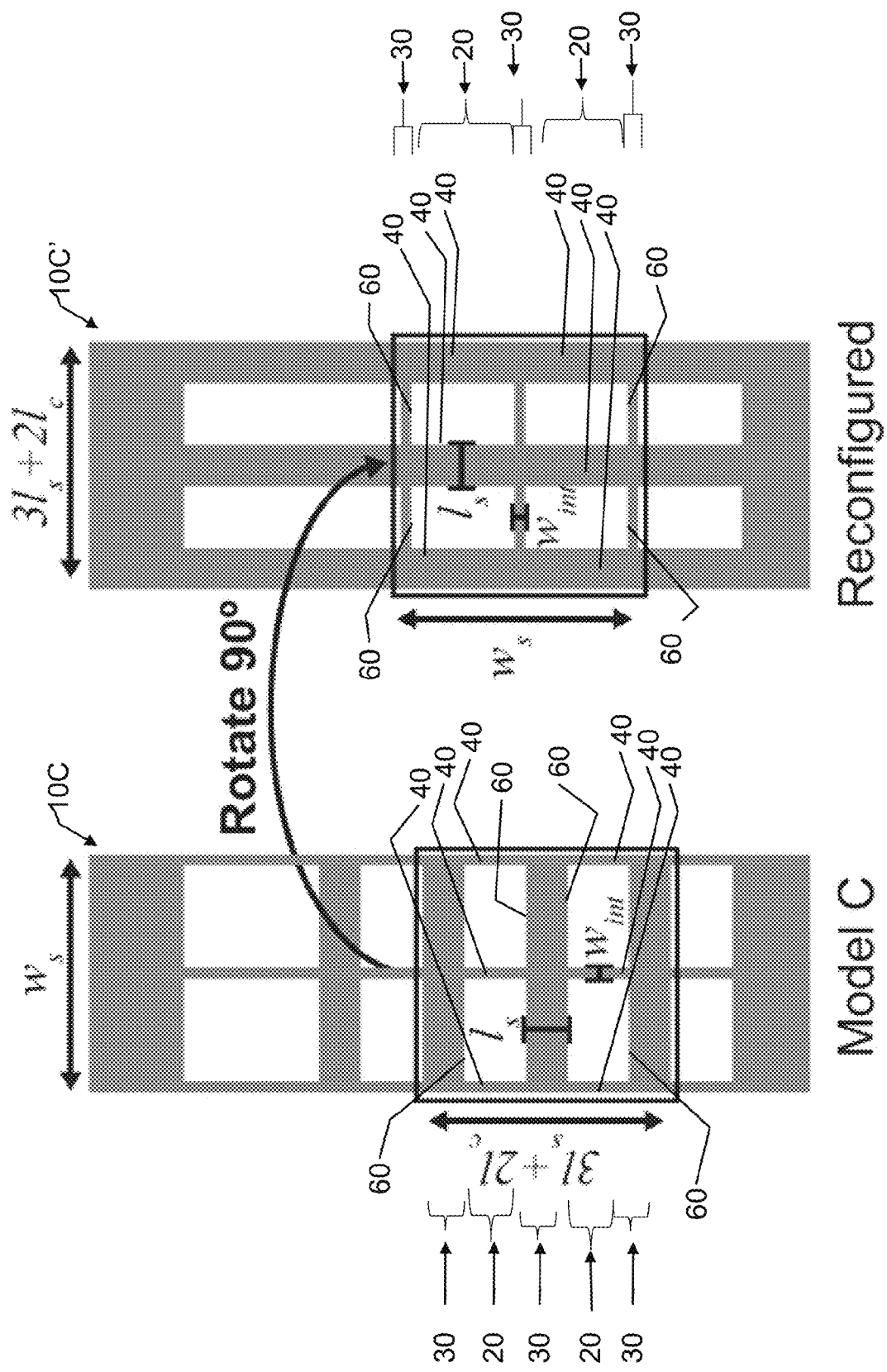
Figure 4B:
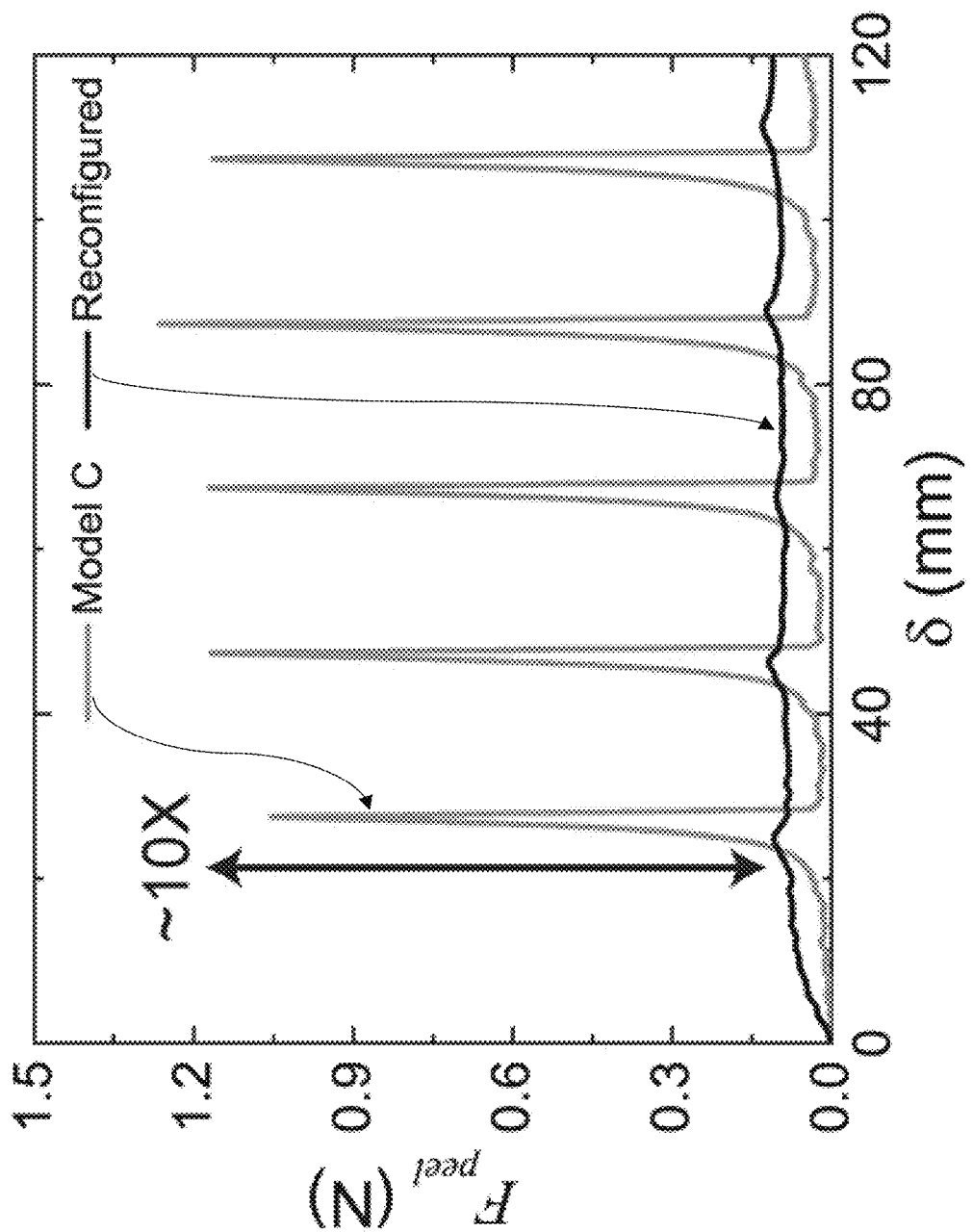
Figure 4D:
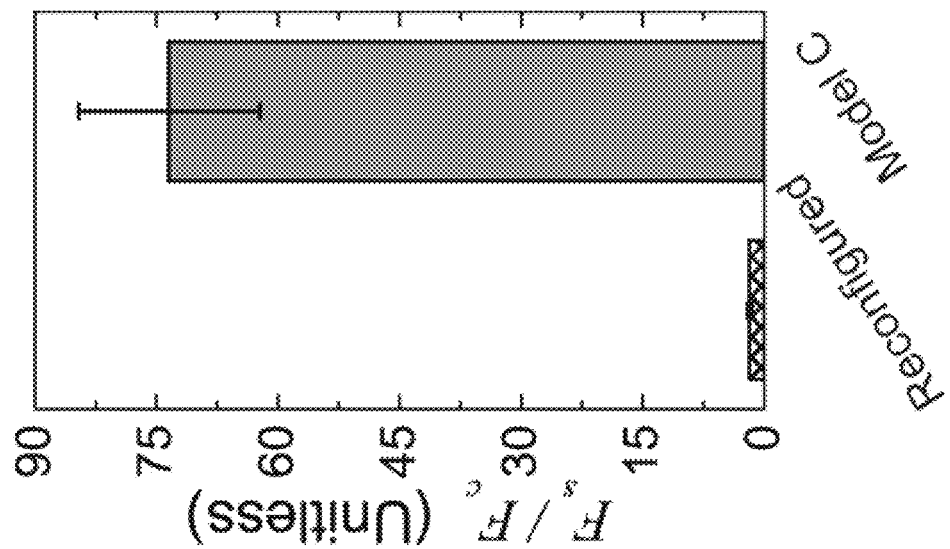
Figure 4C:
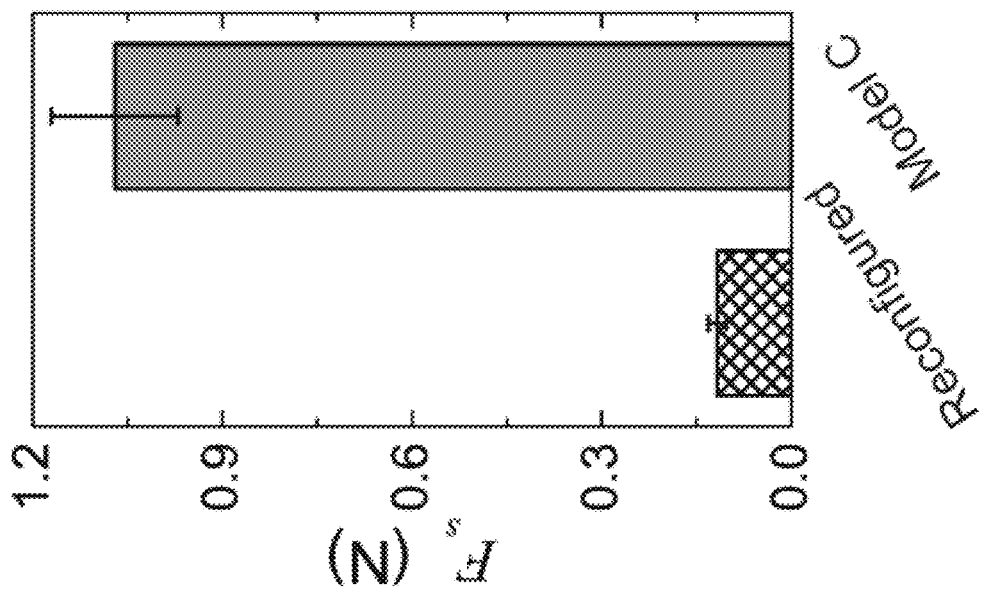

Owing to the directional nature of the kirigami structures, kirigami-inspired adhesives are expected to display anisotropic adhesive characteristics. This is investigated by selecting a unit cell in the model C design 10C and rotating 90° with constant dimensions to create a reconfigured model 10C' (FIG. 4A). FIG. 4B shows a plot of the normalized peel force as a function of displacement for a model C adhesive 10C and a directionally reconfigured adhesive 10C' ($l_s$=8 mm and $w_{int}$=2 mm). The average peak force of the model C design 10C is ~10× higher than that of the reconfigured model 10C'. FIG. 4C-D summarizes these results by plotting the peak force $F_s$ and the adhesion enhancement ratio $F_s/F_c$ of the two directionally contrasting designs. It is shown that when cuts are perpendicular to the crack propagation direction, the peak force and enhancement ratio are high. Alternatively, the reconfigured model 10C' has cuts parallel to the crack propagation direction, resulting in a low peak force and enhancement ratio. This is due to two primary factors. First, model C meets the criterion $l_s > l_{ch,s}$, whereas the reconfigured design 10C' does not, resulting in enhanced crack trapping and adhesion enhancement for model C. Second, the actual contact width in the compliant region for model C is reduced, where $w_c = 0.13 w_s$, whereas the reconfigured structure 10C' has $w_c = 0.50 w_s$.

Figure 4E:
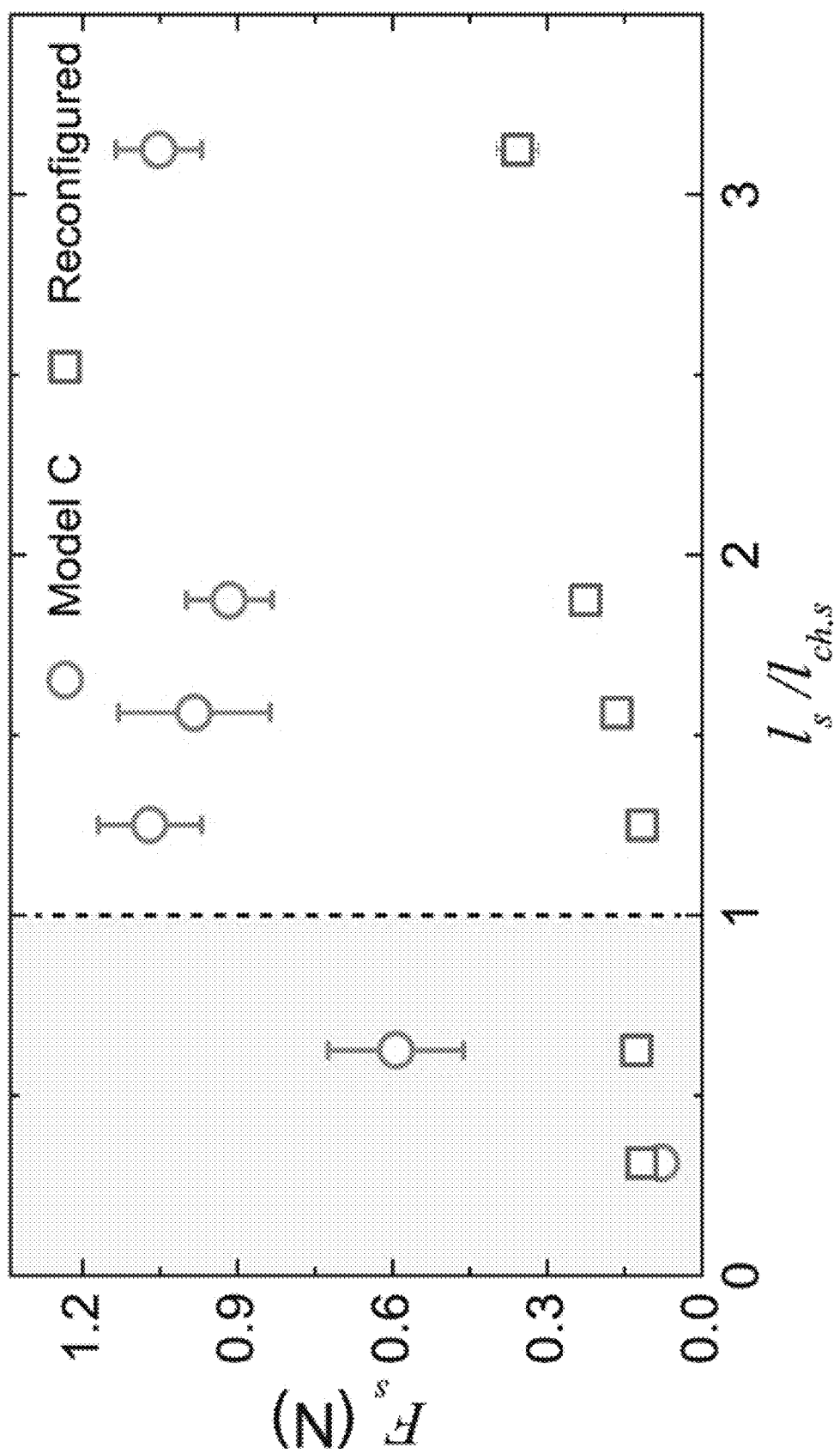
Figure 4F:
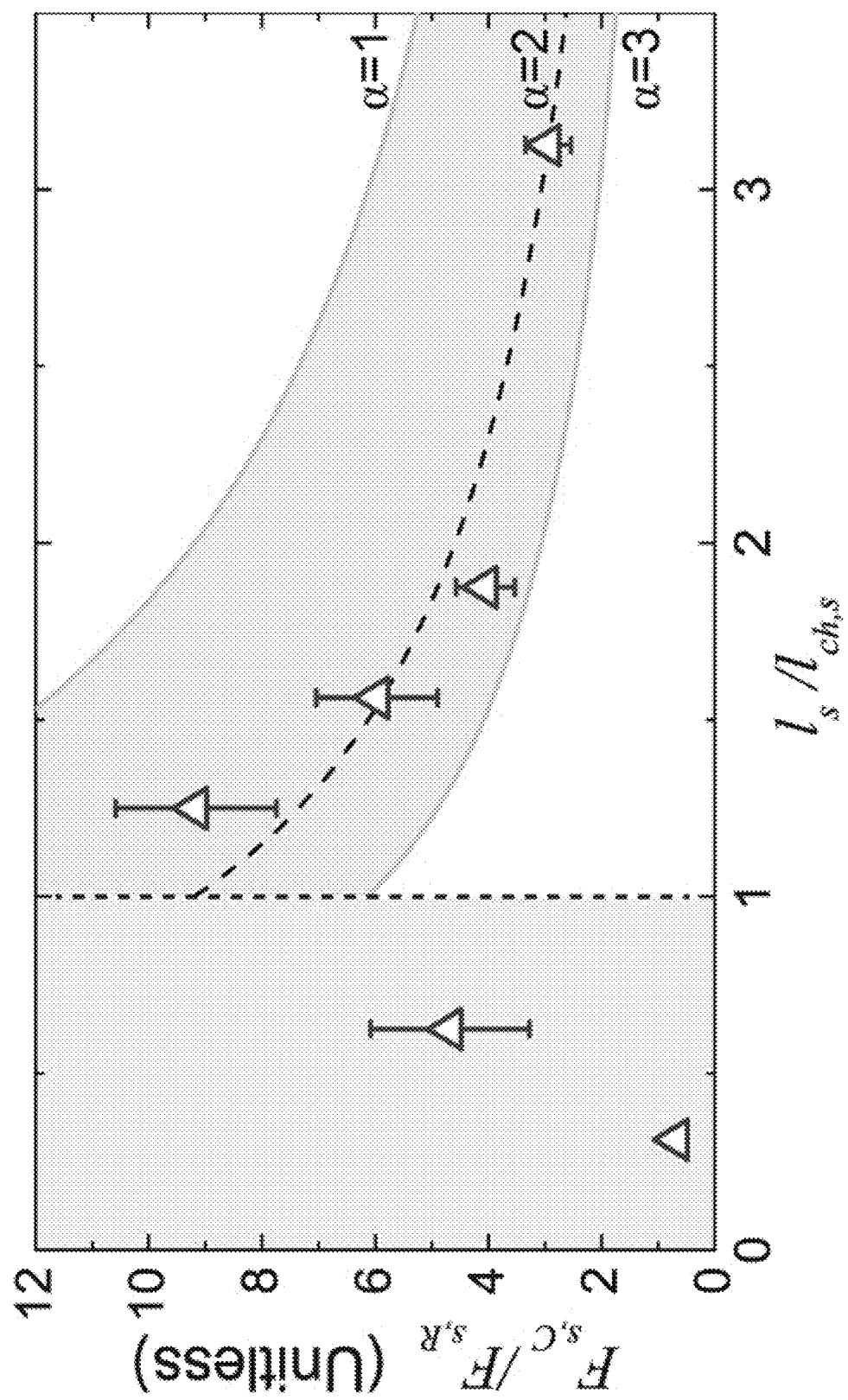

To design cut patterns for anisotropic adhesion, we consider the following criteria. For model C, $l_s > l_{ch,s}$ and $w_{int} \ll l_{ch,s}$; this will result in an increased $F_{s,C}$ and a decreased $F_{c,C}$, where we introduce the second subscript to denote the design. Upon reconfiguring model C (90° rotation), the slender interconnects 40 from model C become the stiff regions 30 in the reconfigured model 10C', where because of the condition that $w_{int} < l_{ch,s}$, the crack will not be fully arrested and $F_{s,R}$ will be reduced. Further, the contact width at the stiff interface in the reconfigured model 10C' should be minimized while still allowing for crack arrest in model C (ref. no. 10C), where we find that $l_{s,C} \simeq l_{ch,s}$. To quantify this effect, first we define the adhesion anisotropy ratio as $F_{s,C}/F_{s,R}$, where $F_{s,C}$ is the peak force in model C and $F_{s,R}$ is the peak force in the reconfigured model. Given the conditions above, the stiffness variation in the reconfigured model is reduced, and approximations are made such that $w_{s,R} = w_{c,R}$ and $F_{s,R} = \alpha F_{c,R}$, where $\alpha$ describes the magnitude of the crack arrest in the reconfigured model with $\alpha$=representing a minimized crack-arresting response. Upon rearranging eq 1 to $F_{s,C} = (E_s I_s w_s / E_c I_c w_c) F_{c,C}$ and substituting the respective $F_s$ terms into the adhesion anisotropy ratio, we find that for $l_s \geq l_{ch,s}$ $$\frac{F_{s,C}}{F_{s,R}} = \frac{E_s I_s w_s}{E_c I_c L_s \alpha} \quad (2)$$

where $$L_s = \sum_{i=1}^{N_R} l_{s,i}$$

and $N_R$ is the number of rotated stiff segments 30 in the reconfigured model 10C'. This shows that the adhesion anisotropy ratio is inversely proportional to $l_s$ when $l_s \geq l_{ch,s}$, demonstrating that for maximum anisotropy ratios, $l_s$ should be approximately equal to $l_{ch,s}$ to provide enhancement in model C (ref. no. 10C) while minimizing peel width during removal of the reconfigured model 10C'. This is experimentally examined by varying $l_s$ across the range $0.3 l_{ch,s} \leq l_s \leq 3.1 l_{ch,s}$ for model C and the reconfigured model and measuring $F_{s,C}$ and $F_{s,R}$. As shown in FIG. 4E, $F_{s,C}$ increases until $l_s/l_{ch,s} \simeq 1$ at which point $F_{s,C}$ reaches a plateau value, whereas $F_{s,R}$ increases throughout the $l_s/l_{ch,s}$ range as the peel width increases. Therefore, when looking at the adhesion anisotropy ratio ($F_{s,C}/F_{s,R}$) in FIG. 4F, a maximum value is obtained when $l_s/l_{ch,s} \simeq 1$ and then decreases as $l_s$ increases. When eq 2 is plotted with three different $\alpha$ values, the data is best described by $\alpha = 2$, demonstrating that the modest crack arrest occurs at the stiff regions in the reconfigured model. By further minimizing the crack arrest by decreasing $w_{int}$, the adhesion anisotropy ratio could be further enhanced. These experiments and analyses demonstrate that through designed layouts of elasticity and interconnects, kirigami-inspired adhesives with desired anisotropic properties can be created.

Figure 5A:
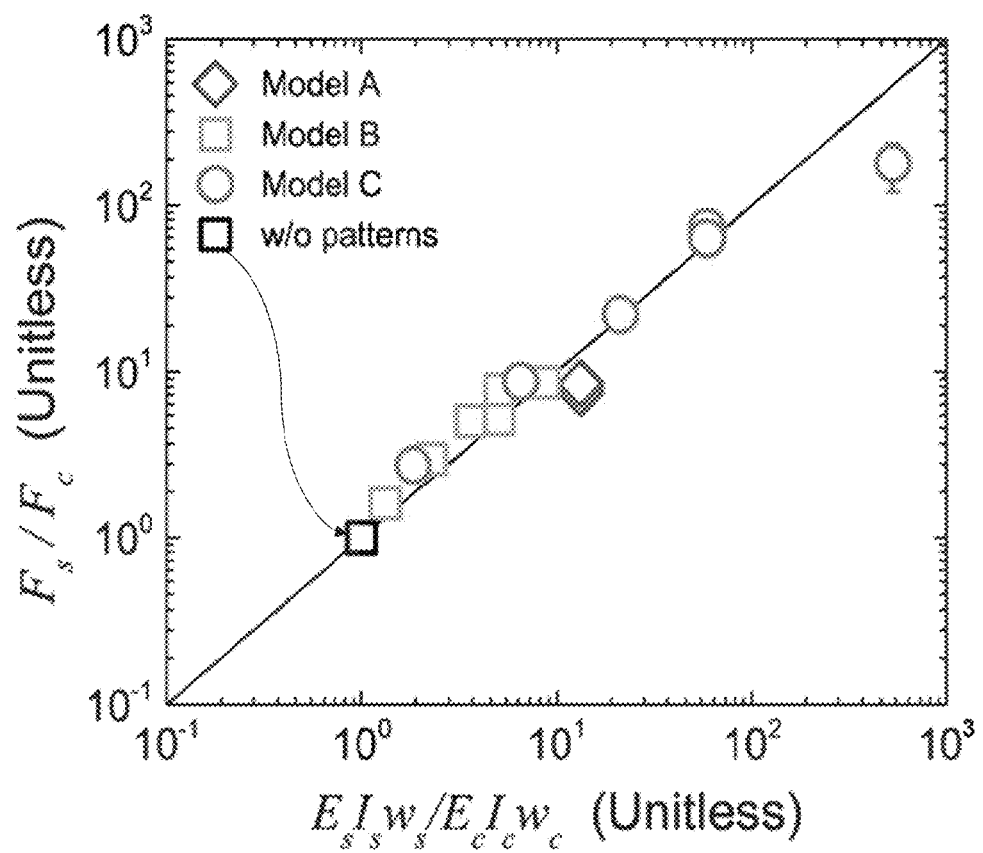

To examine the general behavior of kirigami-inspired adhesives relative to the theoretical predictions from eq 1, we plot the adhesion enhancement ratio ($F_s/F_c$) as a function of the bending stiffness and the width ratio ($E_s I_s w_s / E_c I_c w_c$) in FIG. 5A. The plot shows an excellent agreement between the experimental data and eq 1 without any data-fitting parameters. When an adhesive is homogeneous, there is no enhancement in the peak force ($F_s = F_c$). In contrast, when a periodic layout of kirigami-inspired patterns is introduced onto the adhesive, periodic undulations of the peel force are observed ($F_s > F_c$). The adhesion enhancement ratio $F_s/F_c$ of the kirigami-inspired adhesives varies by a factor of ~100 relative to a homogeneous adhesive. For the case of models B (ref. no. 10B) and C (ref. no. 10C), experimental data points are distributed along the prediction line, which depends on the number of interconnects 40 in the compliant regions 20. The peak force $F_s$ and the adhesion enhancement ratio $F_s/F_c$ decrease with an increasing number of interconnects 40 as the heterogeneous system becomes more similar to a homogeneous strip (see FIG. 3C inset for details). A deviation from this prediction is observed for model C with a single interconnect (N=1), where the theory overpredicts the experimental value. We attribute this deviation to the poor load sharing across the single interconnect. These results provide a general design criteria for kirigami-inspired adhesives under peel loading, where further tuning of the interfacial structure such as changing thickness, interconnect geometry, or materials could lead to greater enhancements and control of the adhesion force.

Figure 5B:
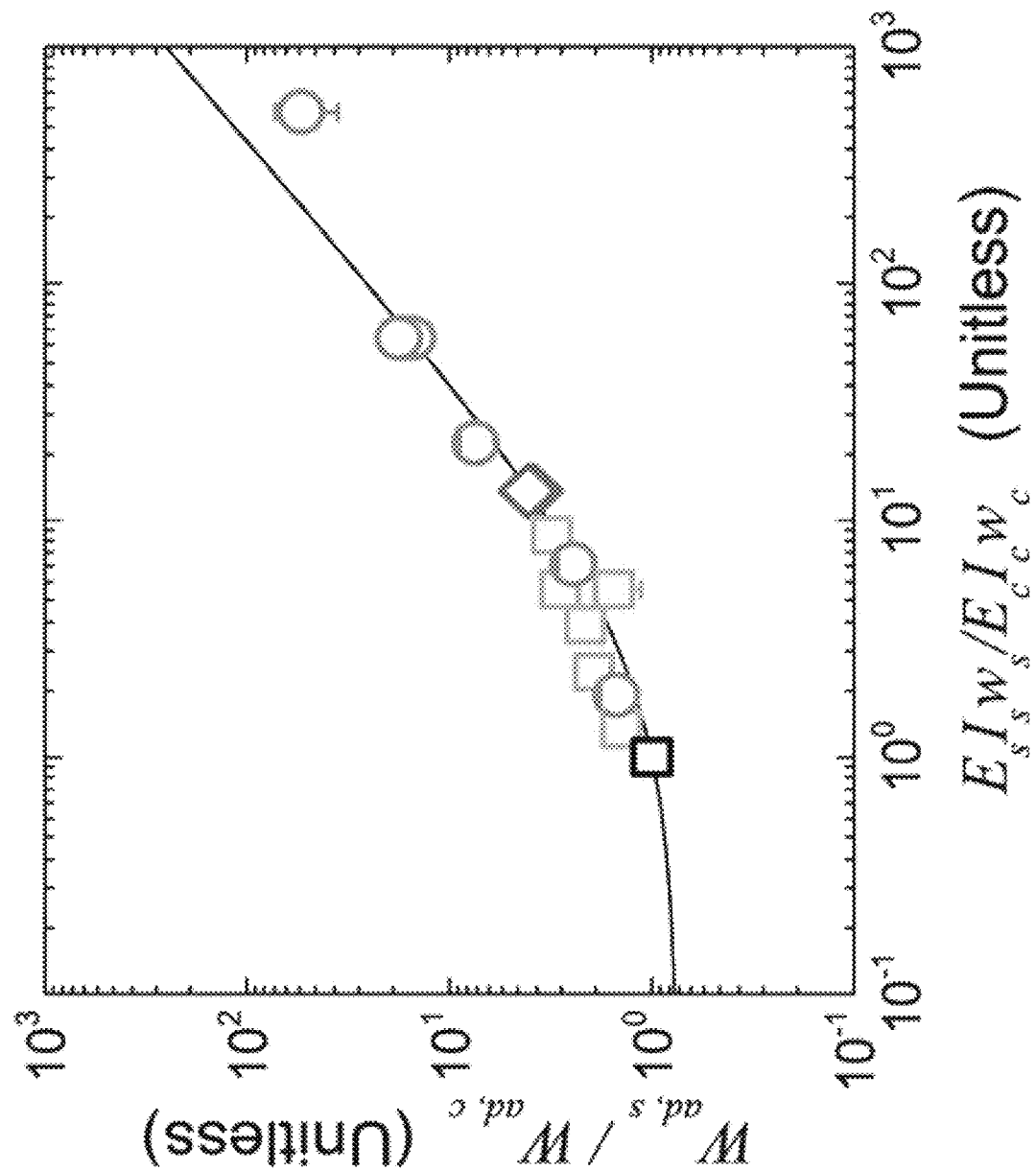

We also compute the work of adhesion $W_{ad}$ of kirigami-inspired adhesives, which represents the work done by an external loading system during the creation of new surfaces between the adhesive and the substrate.[44] The work of adhesion when a peel front crosses a stiff interface is given by calculating the area under the curve of a peel force-displacement plot such that $$\frac{1}{w_s(\delta_p - \delta_0)} \int_{\delta_0}^{\delta_p} F(\delta) d\delta,$$

where $\delta_0$ is the displacement at which the crack begins transversing a stiff interface and $\delta_p$ is the displacement at the peak force. The enhancement ratio in the work of adhesion $W_{ad,s}/W_{ad,c}$ as a function of $E_s I_s w_s / E_c I_c w_c$ is presented in FIG. 5B, where $W_{ad,s}/W_{ad,c}$ increases as $E_s I_s w_s / E_c I_c w_c$ increases. Here, we find $$\frac{W_{ad,s}}{W_{ad,c}} \approx \frac{1}{4} \frac{E_s I_s w_s}{E_c I_c w_c},$$

which shows that the enhancement in the work of adhesion increases at a slower rate than the enhancement in the force with respect to $E_s I_s w_s / E_c I_c w_c$. This difference in the scaling for force and the work of adhesion provides a mechanism to increase force capacity without expending excess energy during separation. This could be useful for applications such as climbing robots, where adhesive capacity is desirable for supporting loads without large amounts of energy consumption during locomotion.

Figure 5C:
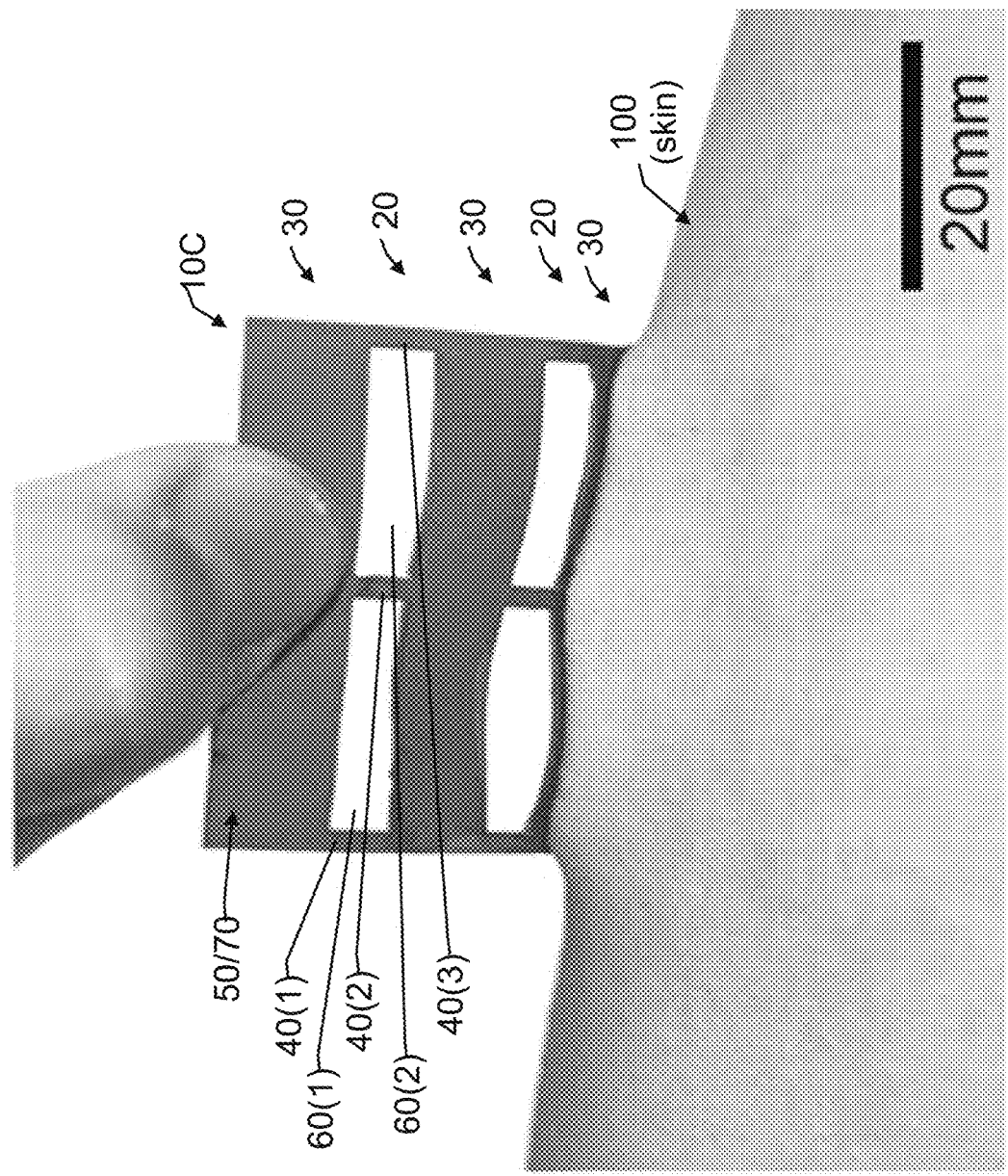
Figure 5D:
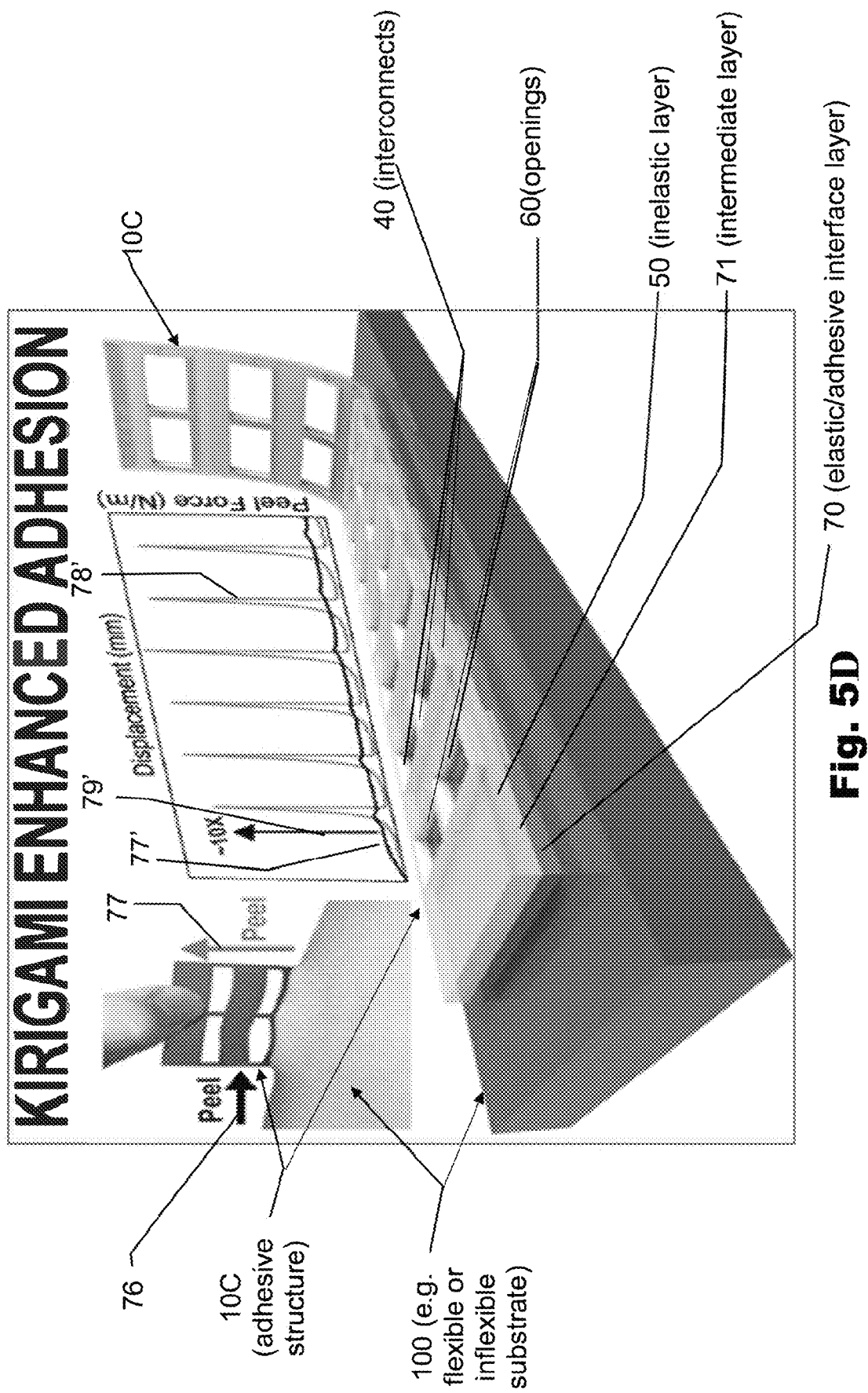

These results provide guidance for the design and implementation for new classes of adhesive materials. We believe this work will be useful for bandages and wearable electronics, where adhesion to skin can be controlled spatially and directionally. Additionally, as functional kirigami devices find uses in skin-mounted applications, the principles developed here can provide insights into component placement and interfacial structure for controlled and strong adhesion. To highlight this potential, a kirigami-inspired adhesive is mounted on the arm 100, as the surface to which structure 10C is mounted, as shown in Figure 5C. When peeled perpendicular to the cuts (here openings 60 in compliant regions 20), a high resistance to peeling is observed at every compliant-to-stiff (20-to-30) interface; however, it is easily peeled off when the cuts are parallel to the peeling direction, as the peel front propagates without meeting a stiff interface 30, as demonstrated in the anisotropic results in FIGS. 4A-F. This proof of concept for spatially controlled and anisotropic adhesives demonstrates a path for high-capacity, easy-release dry bandages and wearable devices.

2. CONCLUSIONS

We have shown that tunable enhanced adhesion and anisotropic adhesion responses can be developed through kirigami-inspired adhesives. The design criteria developed here shows that the force capacity of kirigami-inspired adhesives is controlled by two primary parameters: the difference in bending stiffness $E_s I_s / E_c I_c$ and contact width $w_s/w_c$ and that the length of stiff regions can be utilized to tune adhesion anisotropy. Combined with recent advances in digital manufacturing with subtractive techniques such as laser cutting and additive techniques such as three-dimensional and four-dimensional printing, the concepts and general design criteria presented in this work provide tools for generating highly controlled adhesive materials. This can enable advanced adhesives and wearable devices with programmed properties for diverse adhesive applications. Details about three- and four-dimensional additive printing can be found at U.S. Pat. No. 9,126,367 B1 issued Sep. 8, 2015 to applicant Markforged, Inc. and WO 2018/078987 A1, published May 11, 2017 by applicant Lawrence Livermore National Security, LLC, respectively, both of which are incorporated by reference herein.

3. EXPERIMENTAL SECTION

Fabrication. PET films (Grainger, E=2.6±0.1 GPa, ($t_{PET}$=125 μm) are patterned by laser cutting (Epilog Laser Fusion M2, 75 W) and are coated with an adhesive primer (BJB Enterprises SC-5004 silicone primer) on both sides for enhancing the adhesive strength between the PET films and PDMS layers. A thin PDMS elastomer layer (Sylgard 184 with a 20:1 base-to-curing ratio; Dow Corning, E=880±40 kPa, tPDMS≈300 μm) is formed on an acrylic sheet using a thin-film applicator (ZUA 2000; Zehntner Testing Instruments) and then precured at 80° C. for 20 min. The prepared PET film is deposited onto the undercured PDMS layer and is then returned to the oven for 100 min for further curing. Another PDMS batch of an identical mixing ratio is cast onto the cured bilayer sample to form a trilayer structure using the same technique. This is cured at 80° C. for 19 h. For model C (ref. no. 10C), PDMS sections in the compliant region 20 are removed by laser cutting.

Figure 9:
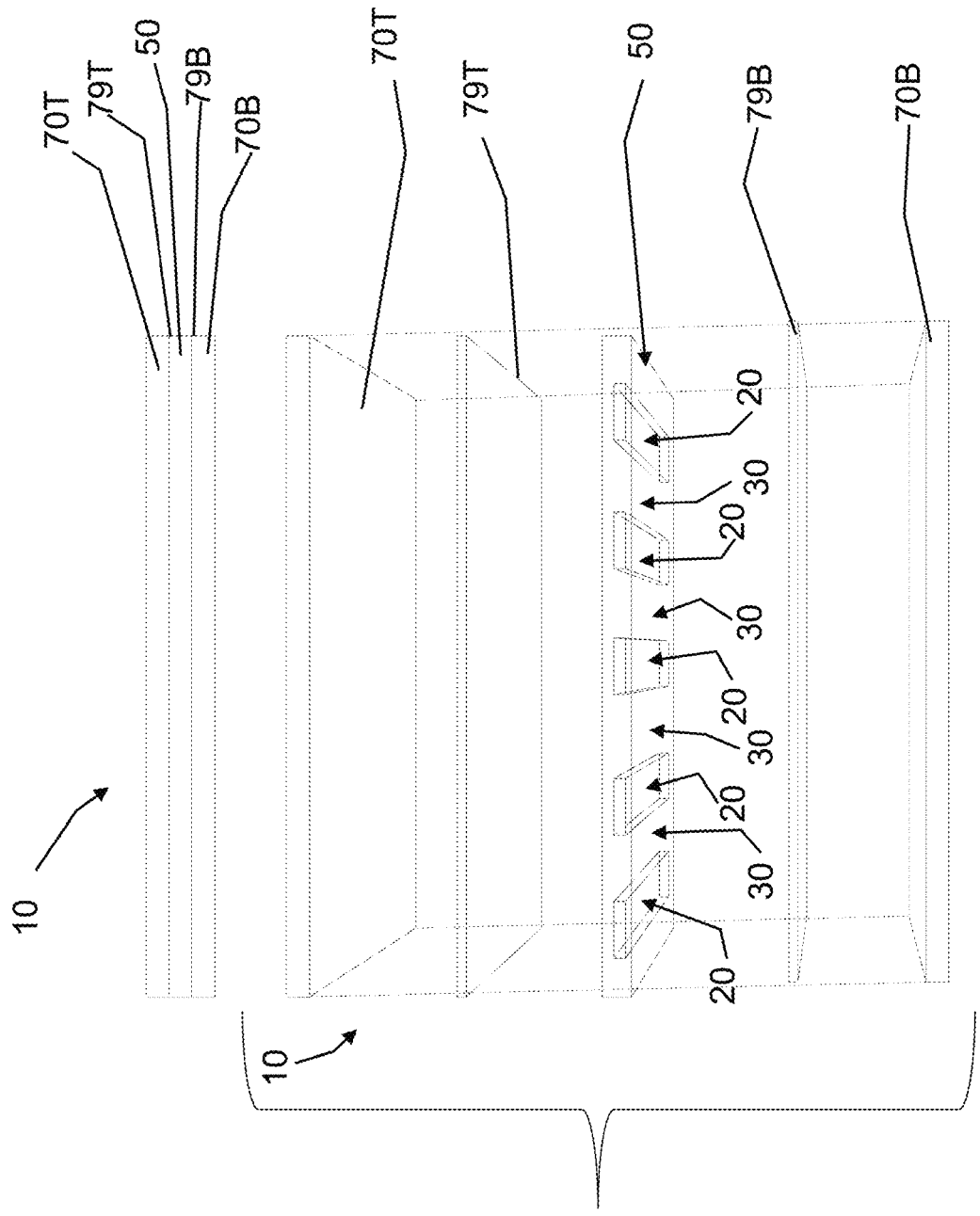
FIGS. 9A and 9B are diagrammatic illustrations of one way to form a composite tri-layer laminate version of an adhesive structure according to one exemplary embodiment of the invention.

See, e.g., FIGS. 9a and 9b. FIG. 9a diagrammatically illustrates a trilayer as described above; here a structure 10 comprising an inelastic layer 50 patterned with alternating rigid and compliant regions 30 and 20, and when assembled sandwiched by top and bottom elastic layers 70T and 70B, with adhesive primers indicated at 79T and 70B. FIG. 9b shows structure 10 of FIG. 9a in exploded view.

Figure 7A:
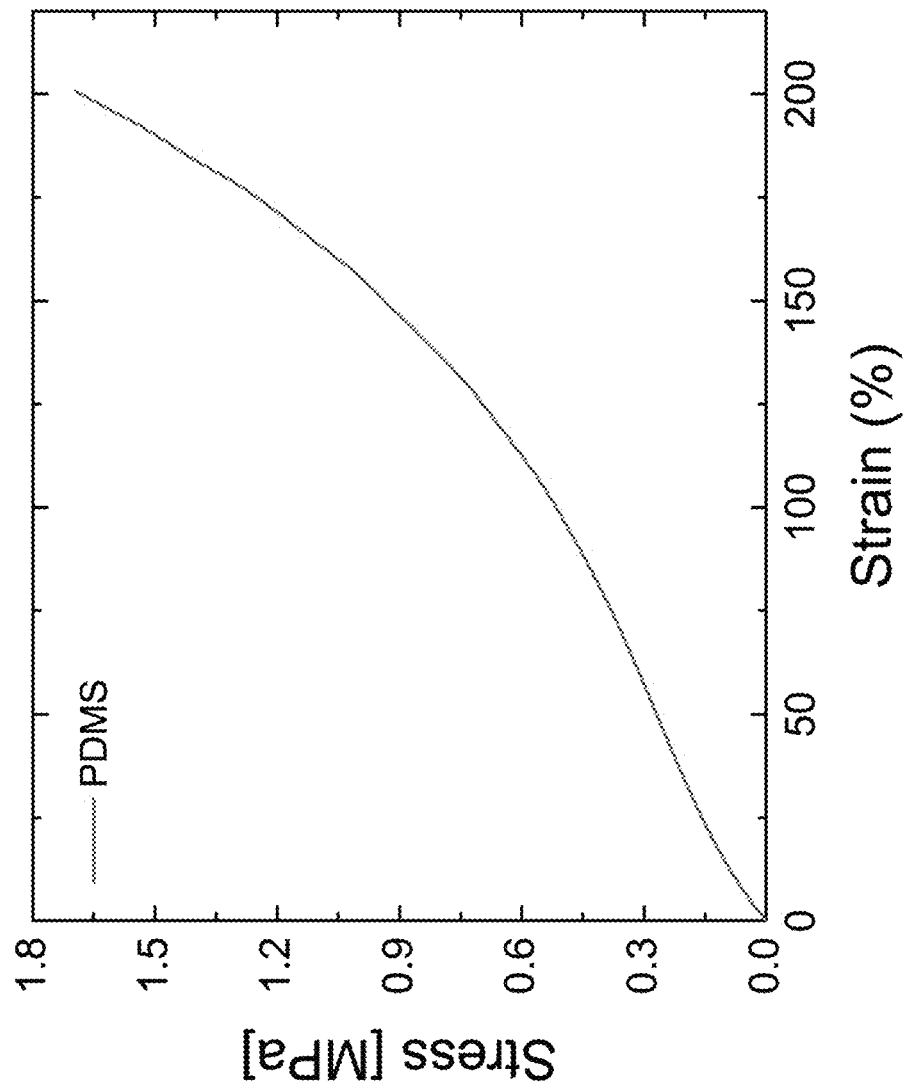
FIGS. 7A and 7B are stress versus strain curves for FIG. 7A PDMS with a 20:1 base-to-curing ratio and FIG. 7B PET under tensile loading.
Figure 7B:
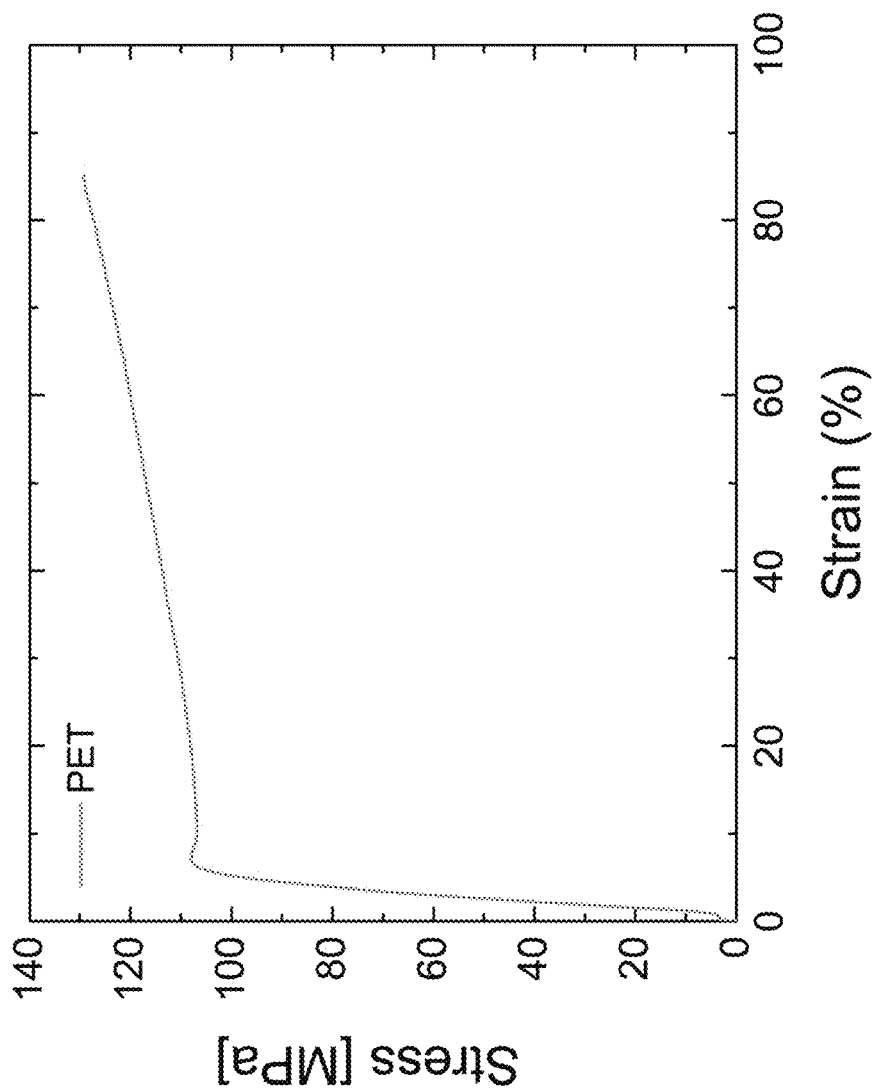

18 Mechanical Testing. Samples (PDMS with a 20:1 base-to-curing ratio and PET) are prepared in a dogbone shape, and tests are conducted on an Instron 5944 mechanical testing machine at a constant displacement rate of 1 mm/s. FIGS. 7a,b present the stress-strain curves for PDMS and PET dogbone samples, respectively. The elastic modulus is computed as the slope of the linear loading curve. FIG. 8 is a table showing tensile modulus, tensile strength and strain at fracture of PDMS and PET dogbone samples.

Characterization. A 90° peel test setup (Universal Grip) is employed to measure peel forces between an adhesive pad 10 and a substrate 100 on an Instron 5944 mechanical testing machine at a constant displacement rate of 1 mm/s. Before each run, the surface of each specimen is cleaned with isopropyl alcohol and Scotch tape to remove all residues. Pressure is applied to the adhesive pad 10 with a roller with a dwell time of 3 min before each test. The interfacial energy $G_c = F_c/w$ is calculated for each specimen by averaging the data points in the plateau compliant region before a peel front meets the first stiff interface 30.

Bending Rigidity Calculations. For the bending rigidity calculations, we assume that the stiff region 30 and interconnects 40 in the compliant region 20 are composed of a single PET strip 50 without considering the two encapsulating PDMS layers 70, such that $E_s I_s$ is equal to $E_{PET} I_{s,PET}$ and $E_c I_c$ is equal to $E_{PET} I_{c,PET} + E_{PDMS} I_{c,PDMS}$, where $E_{PDMS} I_{c,PDMS}$ is the bending stiffness of the PDMS sections between the interconnects 40 in the compliant regions 20. We justify the assumption in our particular system as the bending stiffness of PET is approximately equal to that of the entire trilayer 70/50/70 ($E_{PET} I_{PET} \approx E_{trilayer} I_{trilayer}$) because of the significantly larger PET modulus compared to PDMS ($E_{PET} \approx 3000 E_{PDMS}$).

4. ASSOCIATED CONTENT

Supporting Information

The Supporting Information is available free of charge on the ACS Publications website at DOI: 10.1021/acsami.7b18594. Peel adhesion images and mechanical characterization of materials (PDF) (incorporated by reference herein).

5. REFERENCES (1) Hanakata, P. Z.; Qi, Z.; Campbell, D. K.; Park, H. S. Highly stretchable MoS2 kirigami. *Nanoscale* 2016, 8, 458-463.

(2) Sussman, D. M.; Cho, Y.; Castle, T.; Gong, X.; Jung, E.; Yang, S.; Kamien, R. D. Algorithmic lattice kirigami: A route to pluripotent materials. *Proc. Natl. Acad. Sci. U.S.A.* 2015, 112, 7449-7453.

(3) Castle, T.; Sussman, D. M.; Tanis, M.; Kamien, R. D. Additive lattice kirigami. *Sci. Adv.* 2016, 2, No. e1601258.

(4) Castle, T.; Cho, Y.; Gong, X.; Jung, E.; Sussman, D. M.; Yang, S.; Kamien, R. D. Making the cut: Lattice kirigami rules. *Phys. Rev. Lett.* 2014, 113, 245502.

(5) Shyu, T. C.; Damasceno, P. F.; Dodd, P. M.; Lamoureux, A.; Xu, L.; Shlian, M.; Shtein, M.; Glotzer, S. C.; Kotov, N. A. A kirigami approach to engineering elasticity in nanocomposites through patterned defects. *Nat. Mater.* 2015, 14, 785-789.

(6) Iwata, Y.; Iwase, E. Stress-Free Stretchable Electronic Device. 2017 *IEEE 30th International Conference on Micro Electro Mechanical Systems, MEMS,* 2017; pp 231-234.

(7) Song, Z.; Wang, X.; Lv, C.; An, Y.; Liang, M.; Ma, T.; He, D.; Zheng, Y.-J.; Huang, S.-Q.; Yu, H.; Jiang, H. Kirigami-based stretchable lithium-ion batteries. *Sci. Rep.* 2015, 5, 10988.

(8) Someya, T.; Kato, Y.; Sekitani, T.; Iba, S.; Noguchi, Y.; Murase, Y.; Kawaguchi, H.; Sakurai, T. Conformable, flexible, large-area networks of pressure and thermal sensors with organic transistor active matrixes. *Proc. Natl. Acad. Sci. U.S.A.* 2005, 102, 12321-12325.

(9) Lamoureux, A.; Lee, K.; Shlian, M.; Forrest, S. R.; Shtein, M. Dynamic kirigami structures for integrated solar tracking. *Nat. Commun.* 2015, 6, 8092.

(10) Guo, H.; Yeh, M.-H.; Lai, Y.-C.; Zi, Y.; Wu, C.; Wen, Z.; Hu, C.; Wang, Z. L. All-in-One Shape-Adaptive Self-Charging Power Package for Wearable Electronics. *ACS Nano* 2016, 10, 10580-10588.

(11) Yamamoto, Y.; Harada, S.; Yamamoto, D.; Honda, W.; Arie, T.; Akita, S.; Takei, K. Printed multifunctional flexible device with an integrated motion sensor for health care monitoring. *Sci. Adv.* 2016, 2, No. e1601473.

(12) Saha, B.; Baek, S.; Lee, J. Highly Sensitive Bendable and Foldable Paper Sensors Based on Reduced Graphene Oxide. *ACS Appl. Mater. Interfaces* 2017, 9, 4658-4666.

(13) Kim, D.-H.; Lu, N.; Ma, R.; Kim, Y.-S.; Kim, R.-H.; Wang, S.; Wu, J.; Won, S. M.; Tao, H.; Islam, A.; Yu, K. J.; Kim, T.-i.; Chowdhury, R.; Ying, M.; Xu, L.; Li, M.; Chung, H.-J.; Keum, H.; McCormick, M.; Liu, P.; Zhang, Y.-W.; Omenetto, F. G.; Huang, Y.; Coleman, T.; Rogers, J. A. Epidermal Electronics. *Science* 2011, 333, 838-843.

(14) Mahdavi, A.; Ferreira, L.; Sundback, C.; Nichol, J. W.; Chan, E. P.; Carter, D. J. D.; Bettinger, C. J.; Patanavanich, S.; Chignozha, L.; Ben-Joseph, E.; Galakatos, A.; Pryor, H.; Pomerantseva, I.; Masiakos, P. T.; Faquin, W.; Zumbuehl, A.; Hong, S.; Borenstein, J.; Vacanti, J.; Langer, R.; Karp, J. M. A biodegradable and biocompatible gecko-inspired tissue adhesive. *Proc. Natl. Acad. Sci. U.S.A.* 2008, 105, 2307-2312.

(15) Baik, S.; Kim, D. W.; Park, Y.; Lee, T.-J.; Ho Bhang, S.; Pang, C. A wet-tolerant adhesive patch inspired by protuberances in suction cups of octopi. *Nature* 2017, 546, 396-400.

(16) Kim, S.; Spenko, M.; Trujillo, S.; Heyneman, B.; Santos, D.; Cutkosky, M. R. Smooth Vertical Surface Climbing With Directional Adhesion. *IEEE Trans. Robot.* 2008, 24, 65-74.

(17) Hawkes, E. W.; Eason, E. V.; Christensen, D. L.; Cutkosky, M. R. Human climbing with efficiently scaled gecko-inspired dry adhesives. *J. R. Soc., Interface* 2015, 12, 20140675.

(18) Bartlett, M. D.; Crosby, A. J. Material Transfer Controlled by Elastomeric Layer Thickness. *Mater. Horiz.* 2014, 1, 507-512.

(19) Lee, H.; Um, D.-S.; Lee, Y.; Lim, S.; Kim, H.-j.; Ko, H. Octopus-Inspired Smart Adhesive Pads for Transfer Printing of Semiconducting Nanomembranes. *Adv. Mater.* 2016, 28, 7457-7465.

(20) Bartlett, M. D.; Markvicka, E. J.; Majidi, C. Rapid Fabrication of Soft, Multilayered Electronics for Wearable Biomonitoring. *Adv. Funct. Mater.* 2016, 26, 8496-8504.

(21) Kim, S.; Wu, J.; Carlson, A.; Jin, S. H.; Kovalsky, A.; Glass, P.; Liu, Z.; Ahmed, N.; Elgan, S. L.; Chen, W.; Ferreira, P. M.; Sitti, M.; Huang, Y.; Rogers, J. A. Microstructured elastomeric surfaces with reversible adhesion and examples of their use in deterministic assembly by transfer printing. *Proc. Natl. Acad. Sci. U.S.A.* 2010, 107, 17095-17100.

(22) Autumn, K.; Gravish, N. Gecko adhesion: evolutionary nanotechnology. *Philos. Trans. R. Soc., A* 2008, 366, 1575-1590.

(23) Creton, C. Pressure-Sensitive Adhesives: An Introductory Course. *MRS Bull.* 2003, 28, 434-439.

(24) Glassmaker, N. J.; Jagota, A.; Hui, C.-Y.; Noderer, W. L.; Chaudhury, M. K. Biologically inspired crack trapping for enhanced adhesion. *Proc. Natl. Acad. Sci. U.S.A.* 2007, 104, 10786-10791.

(25) Poulard, C.; Restagno, F.; Weil, R.; Léger, L. Mechanical tuning of adhesion through micro-patterning of elastic surfaces. *Soft Matter* 2011, 7, 2543.

(26) Qu, L.; Dai, L.; Stone, M.; Xia, Z.; Wang, Z. L. Carbon Nanotube Arrays with Strong Shear Binding-On and Easy Normal Lifting-Off. *Science* 2008, 322, 238-242.

(27) Aksak, B.; Murphy, M. P.; Sitti, M. Adhesion of biologically inspired vertical and angled polymer microfiber arrays. *Langmuir* 2007, 23, 3322-3332.

(28) Mengüç, Y.; Yang, S. Y.; Kim, S.; Rogers, J. A.; Sitti, M. Gecko-Inspired Controllable Adhesive Structures Applied to Micromanipu-lation. *Adv. Funct. Mater.* 2012, 22, 1246-1254.

(29) Drotlef, D.-M.; Amjadi, M.; Yunusa, M.; Sitti, M. Bioinspired Composite Microfibers for Skin Adhesion and Signal Amplification of Wearable Sensors. *Adv. Mater.* 2017, 29, 1701353.

(30) Kamperman, M.; Kroner, E.; del Campo, A.; McMeeking, R. M.; Arzt, E. Functional Adhesive Surfaces with "Gecko" Effect: The Concept of Contact Splitting. *Adv. Eng. Mater.* 2010, 12, 335-348.

(31) Pham, J. T.; Schellenberger, F.; Kappl, M.; Butt, H.-J. From elasticity to capillarity in soft materials indentation. *Phys. Rev. Materials* 2017, 1, 015602.

(32) Chung, J. Y.; Chaudhury, M. K. Roles of discontinuities in bio-inspired adhesive pads. *J. R. Soc., Interface* 2005, 2, 55-61.

(33) Pendergraph, S. A.; Bartlett, M. D.; Carter, K. R.; Crosby, A. J. Enhancing adhesion of elastomeric composites through facile patterning of surface discontinuities. *ACS Appl. Mater. Interfaces* 2014, 6, 6845-6850.

(34) Chan, E. P.; Karp, J. M.; Langer, R. S. A "self-pinning" adhesive based on responsive surface wrinkles. *J. Polym. Sci., Part B: Polym. Phys.* 2011, 49, 40-44.

(35) Davis, C. S.; Martina, D.; Creton, C.; Lindner, A.; Crosby, A. J. Enhanced Adhesion of Elastic Materials to Small-Scale Wrinkles. *Langmuir* 2012, 28, 14899-14908.

(36) Majumder, A.; Ghatak, A.; Sharma, A. Microfluidic adhesion induced by subsurface microstructures. *Science* 2007, 318, 258-261.

(37) Arul, E. P.; Ghatak, A. Control of adhesion via internally pressurized subsurface microchannels. *Langmuir* 2012, 28, 4339-4345.

(38) Bartlett, M. D.; Croll, A. B.; King, D. R.; Paret, B. M.; Irschick, D. J.; Crosby, A. J. Looking beyond fibrillar features to scale gecko-like adhesion. *Adv. Mater.* 2012, 24, 1078-1083.

(39) King, D. R.; Bartlett, M. D.; Gilman, C. A.; Irschick, D. J.; Crosby, A. J. Creating gecko-like adhesives for "real world" surfaces. *Adv. Mater.* 2014, 26, 4345-4351.

(40) Xia, S.; Ponson, L.; Ravichandran, G.; Bhattacharya, K. Toughening and Asymmetry in Peeling of Heterogeneous Adhesives. *Phys. Rev. Lett.* 2012, 108, 196101.

(41) Xia, S. M.; Ponson, L.; Ravichandran, G.; Bhattacharya, K. Adhesion of heterogeneous thin films I: Elastic heterogeneity. *J. Mech. Phys. Solids* 2013, 61, 838-851.
(42) Kendall, K. Thin-film peeling—the elastic term. *J. Phys. D: Appl. Phys.* 1975, 8, 1449-1452.
(43) Kendall, K. Control of cracks by interfaces in composites. *Proc. R. Soc. London, Ser. A* 1975, 341, 409-428.
(44) Dillard, D. A.; Pocius, A. V. *Adhesion Science and Engineering: Surfaces, Chemistry and Applications*; Elsevier, 2002.

D. Options and Alternative

The invention can take many forms and embodiments. Variations obvious to those skilled in the art will be included within the invention. A few examples follow.

1. Variations of Structure

Models A, B and C discussed above in the Specific Example are non-limiting of the forms the invention can take. For example, Models B and C have at least one interconnect 40 between rigid regions 30. Model A, however, does not. While certain benefits are shown for use of interconnects 40 for the form factors of rigid and compliant regions of Models B and C, benefits are shown for Model A. All models take advantage of common design features relative to the shape and nature of the rigid and compliant regions/sections. Those features can be applied, with variations, to any of Models A, B, or C. The designer can decide if any interconnect(s) are used.

2. Rigid Regions/Sections

The specific example discusses patterning, including by cutting, a relatively rigid film or inelastic layer 50 to form the more rigid or stiff regions or sections along the overall final structure 10.

As indicated above, the rigid regions or sections 30 take different forms. Models A, B, and C are several non-limiting examples.

PET is mentioned as one material for the rigid layer 50. Other materials are possible. A few additional non-limiting examples are:
(a) polyimide;
(b) polyethylene or polypropylene;
(c) acetate film;
(d) polyvinyl chloride;
(e) paper;
(f) polylactic acid;
(g) metallized film; and
(h) fabric.

As a general rule, the relatively rigid material 50 should have the following characteristics:
a. rigidity or stiffness higher than compliant regions 20. Eq 1 shows this quantitatively, as long as the stiffness× contact width is greater in the stiff regions 30, there will be enhancement.
b. durability sufficient for typical forces that will be experienced during use (e.g. bending, strain and stress, temperature, humidity, etc.) that is repeatable over at least a reasonable useful life;
c. practicality for a given application (e.g. in terms of cost, availability, fabrication, and other factors).

Therefore, other materials that meet these types of characteristics are candidates for use. In the case of PET, below is a discussion of some of its specific material characteristics for reference. Other candidate materials for use with the invention may or may not have all or some of these attributes, but they are intended to give context for attributes if PET is used.

PET can take different forms. But it generally has properties such as below (taken from www.goodfellow.com/E/Polyethylene-terephthalate.html?referrer=AZOMDOTCOM&id=1661, accessed Dec. 15, 2018:

(a) PET is a hard, stiff, strong, dimensionally stable material that absorbs very little water. It has good gas barrier properties and good chemical resistance except to alkalis (which hydrolyse it). Its crystallinity varies from amorphous to fairly high crystalline; it can be highly transparent and colourless but thicker sections are usually opaque and off-white.

(b) It is widely known in the form of biaxially oriented and thermally stabilised films usually referred to by their main brand names Mylar, Melinex or Hostaphan. Strictly speaking, these names should be used only for this type of film whose properties are different from, and in several respects superior to, those of "ordinary" PET film.

| Chemical Resistance | |
| --- | --- |
| Acids - concentrated | Good-Poor |
| Acids - dilute | Good |
| Alcohols | Good |
| Alkalis | Poor |
| Aromatic hydrocarbons | Good-Fair |
| Greases and Oils | Good |
| Halogenated Hydrocarbons | Good-Poor |
| Halogens | Fair-Poor |
| Ketones | Good-Fair |
| Electrical Properties | |
| Dielectric constant @1 MHz | 3.0 |
| Dielectric strength ( kV mm$^{-1}$ ) | 17 |
| Dissipation factor @ 1 kHz | 0.002 |
| Surface resistivity ( Ohm/sq ) | $10^{13}$ |
| Volume resistivity ( Ohmcm ) | >$10^{14}$ |
| Mechanical Properties | |
| Coefficient of friction | 0.2-0.4 |
| Hardness - Rockwell | M94-101 |
| Izod impact strength ( J m$^{-1}$ ) | 13-35 |
| Poisson's ratio | 0.37-0.44 (oriented) |
| Tensile modulus ( GPa ) | 2-4 |
| Tensile strength ( MPa ) | 80, for biax film 190-260 |

-continued

| Physical Properties | |
|---|---|
| Density ( g cm$^{-3}$ ) | 1.3-1.4 |
| Flammability | HB |
| Limiting oxygen index ( % ) | 21 |
| Radiation resistance | Good |
| Refractive index | 1.58-1.64 |
| Resistance to Ultra-violet | Fair? |
| Water absorption - equilibrium ( % ) | <0.7 |
| Water absorption - over 24 hours ( % ) | 0.1 |

| Thermal Properties | |
|---|---|
| Coefficient of thermal expansion ( ×10$^{-6}$ K$^{-1}$ ) | 20-80 |
| Heat-deflection temperature - 0.45 MPa ( C. ) | 115 |
| Heat-deflection temperature - 1.8 MPa (C.) | 80 |
| Lower working temperature ( C. ) | −40 to −60 |
| Specific heat ( J K$^{-1}$ kg$^{-1}$ ) | 1200-1350 |
| Thermal conductivity @23 C. ( Wm$^{-1}$ K$^{-1}$) | 0.15-0.4 |
| Upper working temperature ( C. ) | 115-170 |

Properties for Polyethylene terephthalate Chopped Fibre

| Property | Value | | |
|---|---|---|---|
| Material | | Medium | High tenacity |
| Density | g cm$^{-3}$ | 1.39 | 1.39 |
| Extension to break | % | 36 | 13-16 |
| Modulus | GPa | | 9-11 |
| Specific Modulus | cN/tex | | 700-800 |
| Shrinkage @100 C. | % | 4 | 1.5-6 |
| Specific Tenacity | cN/tex | 36 | 70-80 |

Properties for Polyethylene terephthalate Fibre

| Property | Value | | |
|---|---|---|---|
| Material | | Medium | High tenacity |
| Density | g cm$^{-3}$ | 1.39 | 1.39 |
| Extension to break | % | 36 | 13-16 |
| Modulus | GPa | | 9-11 |
| Specific Modulus | cN/tex | | 700-800 |
| Shrinkage @100 C. | % | 4 | 1.5-6 |
| Specific Tenacity | cN/tex | 36 | 70-80 |

Properties for Polyethylene terephthalate Film

| Property | | Value |
|---|---|---|
| Dielectric Strength @25 μm thick | kV mm$^{-1}$ | 300 |
| Dissipation Factor @1 MHz | | 0.016 |
| Elongation at Break | % | 60-165 |
| Initial Tear Strength | g μm$^{-1}$ | 18-54 |
| Permeability to Carbon Dioxide @25 C. | ×10$^{-13}$ cm$^3$ · cm cm$^{-2}$ s$^{-1}$ Pa$^{-1}$ | 0.2 |
| Permeability to Hydrogen @25 C. | ×10$^{-13}$ cm$^3$ · cm cm$^{-2}$ s-1 Pa$^{-1}$ | 0.4 |
| Permeability to Nitrogen @25 C. | ×10$^{-13}$ cm$^3$ · cm cm$^{-2}$ s$^{-1}$ Pa$^{-1}$ | 0.004 |
| Permeability to Oxygen @25 C. | ×10$^{-13}$ cm$^3$ · cm cm$^{-2}$ s-1 Pa$^{-1}$ | 0.03 |
| Permeability to Water @25 C. | ×10$^{-13}$ cm$^3$ · cm cm$^{-2}$ s$^{-1}$ Pa$^{-1}$ | 100 |
| Permeability to Water @38 C. | ×10−13 cm$^3$ · cm cm$^{-2}$ s$^{-1}$ Pa$^{-1}$ | 150 |
| Specific Heat | kJ kg$^{-1}$ K$^{-1}$ | 1.3 |
| Thermal Conductivity @23 C. | W m$^{-1}$ K$^{-1}$ | 0.13-0.15 |

3. Patterning of Rigid Layer

If a layer of more rigid or stiffer material 50 is used for the rigid regions/sections 30, openings 60 in the film 50 can be fabricated in different ways. One example given above is laser cutting of a monolithic film or sheet 50. Such can be done with high precision and without significant alteration of the desired materiel properties of the film for the intended adhesive structure functions by control of the duty cycle and energy in the laser. There are other ways to post-form the openings in a film or sheet 50 (i.e. subtractive fabrication) with acceptable accuracy, speed, and economy. Non-limiting examples are:

(a) rotary die cutting; and
(b) stamping.

Alternatively, additive fabrication techniques are possible. One example is digital printing (e.g. ink jet printing). It is capable of creating from scratch a continuous length of film or sheet 50 with precise openings 60.

Another non-limiting example of additive fabrication is:

(a) Solution coating on a patterned film 50.

Additive printing of a patterned structure in sheet or layer form 50 can be essentially 2D printing of a layer with continuous and open regions along the layer. But it can be 3D in the sense of thickness control (e.g. 3D printing could combine 2D patterns with different thicknesses). The technology of printing has become sophisticated in this manner.

16 Additive printing can still further be 4D printing. For example, one example of 4D printing is that a stimuli could be applied at some point after fabrication to release the printed film or layer. As is known to those skilled in the art, 4-dimensional or 4D printing uses the same techniques of 3D printing through computer-programmed deposition of material in successive layers to create a three-dimensional object, but adds the dimension of transformation over time. Some characterize it as a type of programmable matter, where after fabrication the printed product reacts with parameters (e.g. within the environment such as humidity, temperature, etc.,) and changes its form. One way is in the materials chosen for the printing. Solids with engineered molecular spatial distributions allow near infinite possible configurations based on such material properties at a micrometer resolution. Details about such printing can be found at A. Sydney Gladman, Elisabetta A. Matsumoto, Ralph G. Nuzzo, L. Mahadevan, and Jennifer A. Lewis, Biomimetic 4D printing, Nat. Mater., 2016 April; 15 (4): 413-418, incorporated by reference herein.

A few examples of specific 4D printing techniques include:

(a) Stereolithography. A 3D-printing technique that, instead of a fused deposition where the extruded material hardens immediately to form layers, photopolymerization is used to bind a substrate that has been laid layer upon layer. In most cases ultraviolet light is used to cure the layered materials after the printing process has completed. Anisotropy in direction and magnitude of transformations under a given condition can be created by arranging the micromaterials in a way so that there is an embedded directionality to the finished print.

(b) Pattern-driven 4D Printing. Spatial and temporal transformations can be created through actuation mechanisms such as liquid crystal gel phase transition, thermal expansion coefficient, thermal conductivity discrepancies, and the different swelling and de-swelling ratios of bi-layer or composite beams. As such, It is possible, to achieve rapid and accurate manufacturing methods for controlling spatial self-bending actuation in custom-designed soft structures with 4D printing. In one example 3D-printing parameters, such as different spatial patterns of hinges affecting the response time and bending angle of the 4D print products are used.

As a general rule, achievement of the controlled patterning for use with embodiments according to the invention can be through different techniques, whether additive or subtractive, or a combination of them. They should have the following characteristics:

a. reasonable control over creation of perimeter shape of stiff and compliant regions 30 and 20;

b. reasonable resolution in terms of accuracy and precision of edges along both lengths and thicknesses; and c. reasonable maintenance of intended material properties of stiff and compliant regions 30 and 20 (e.g. subtractive fabrication is non-destructive of the layer; additive fabrication maintains intended characteristics of both types of regions as they are built).

It is to be understood, however, that the precision of shape and edges of stiff and compliant regions 30 and 20 does not have to be absolute. For example, in the case of rectangular openings 60 in a sheet or film 50 as in the specific example above, the generally rectangular stiff and compliant regions 30 and 20 can be generally rectangular. The edges do not have to be extremely precise in terms of linear along each side or planar thickness. As indicated above, at a general level there just must be a change in bending rigidity from one region to the next. This can be accomplished with some variability in shapes and edges of regions.

Figure 6A:
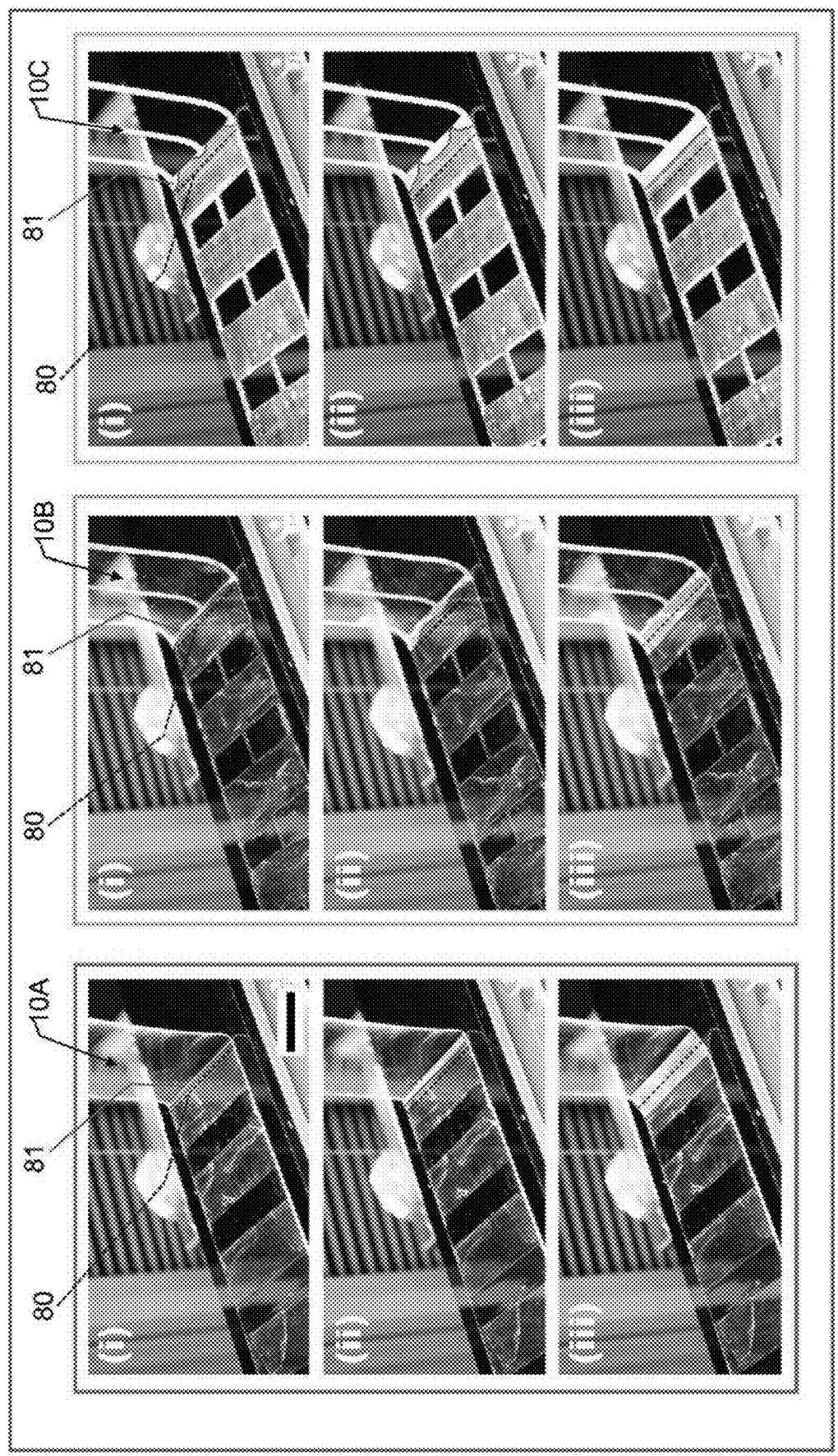
Figure 6B:
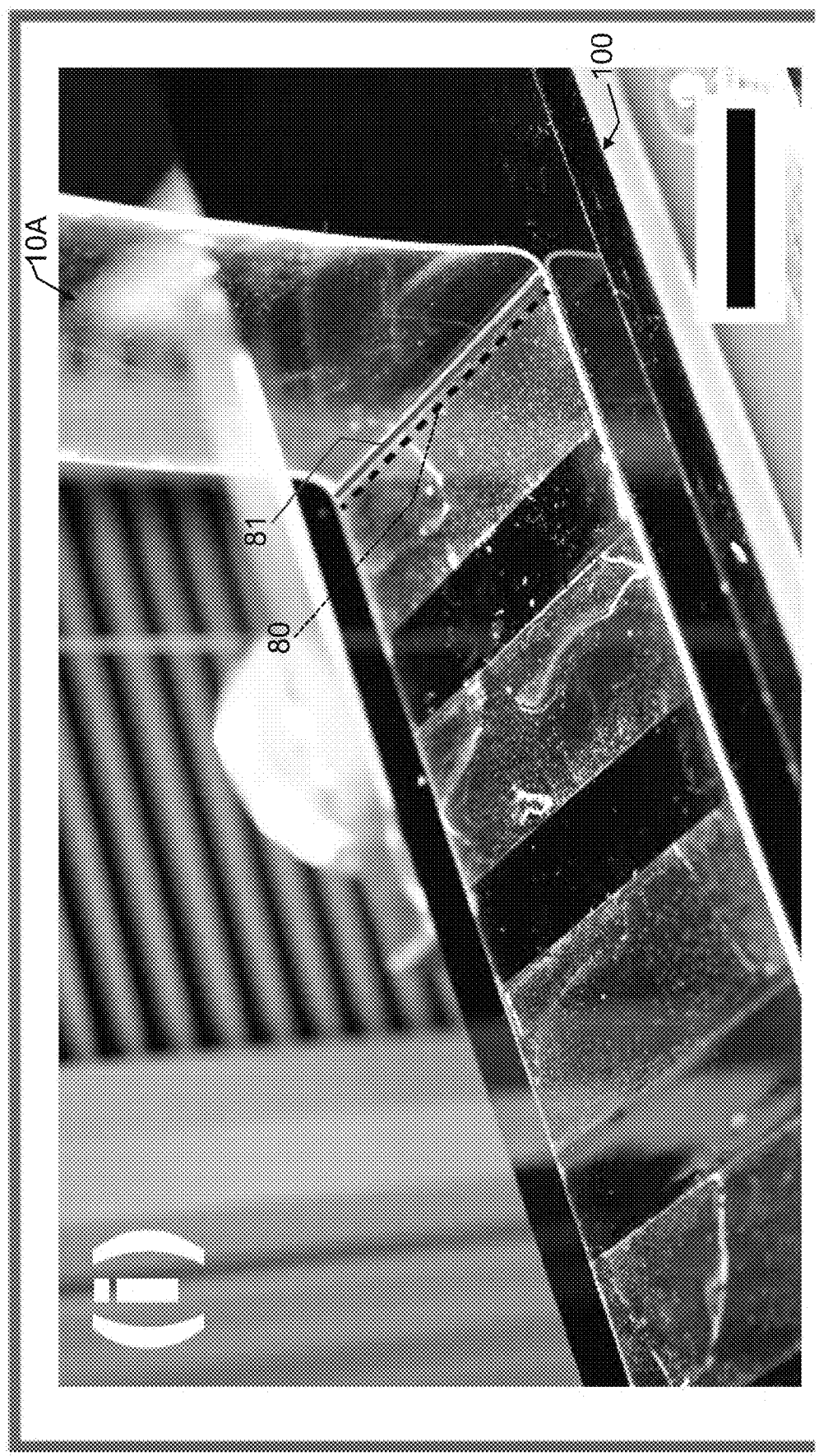
Figure 6C:
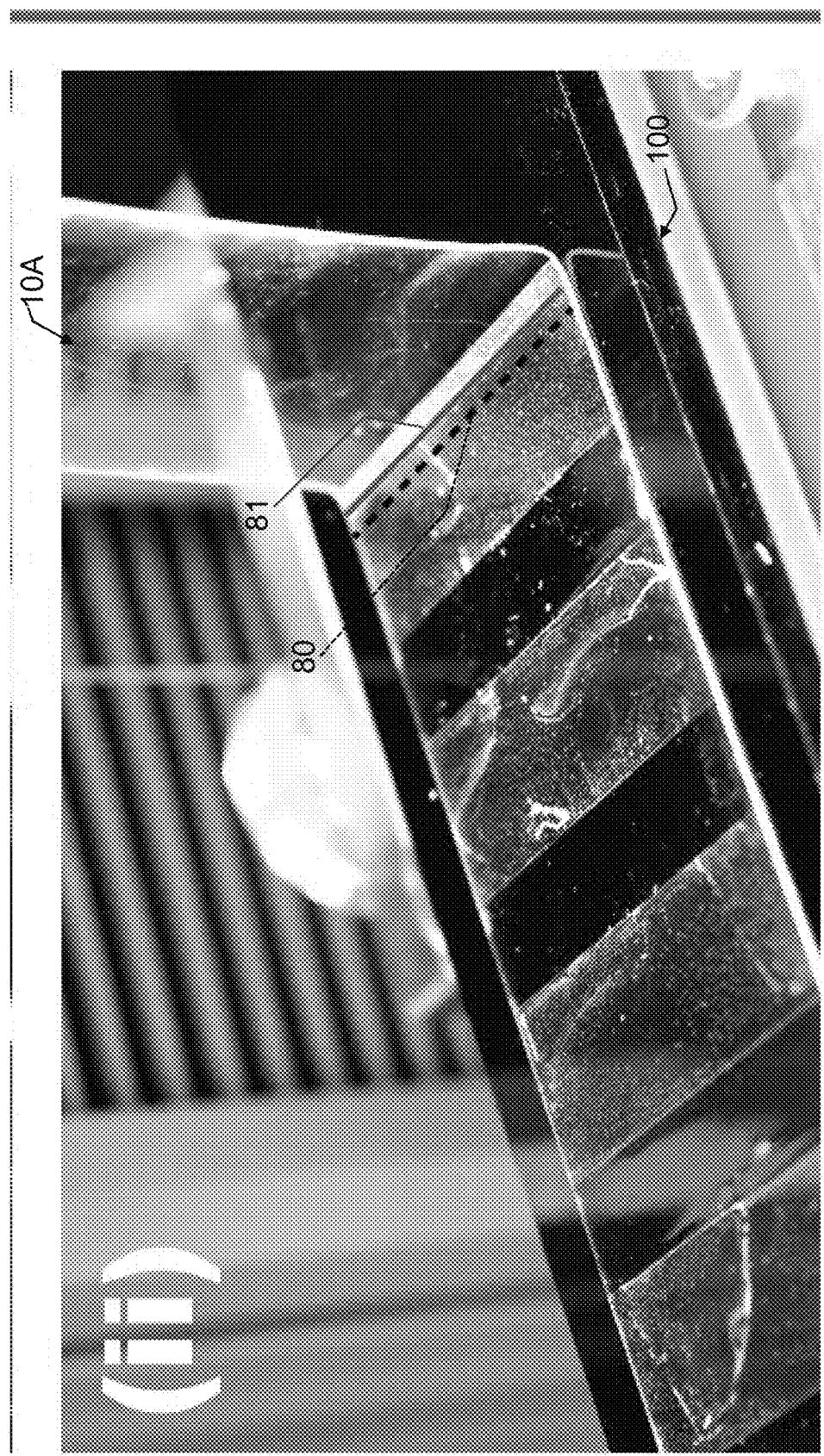
Figure 6D:
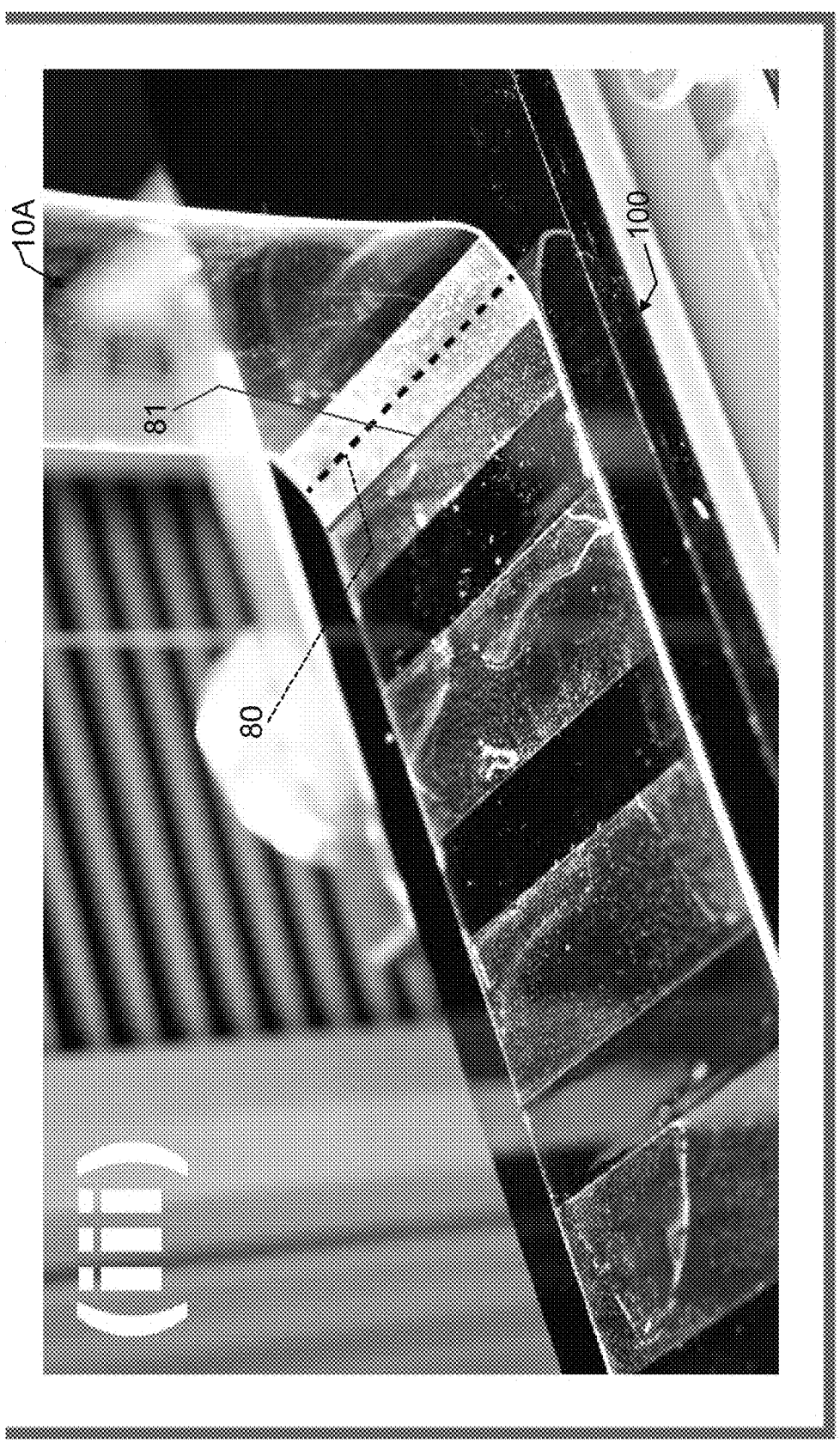
Figure 6E:
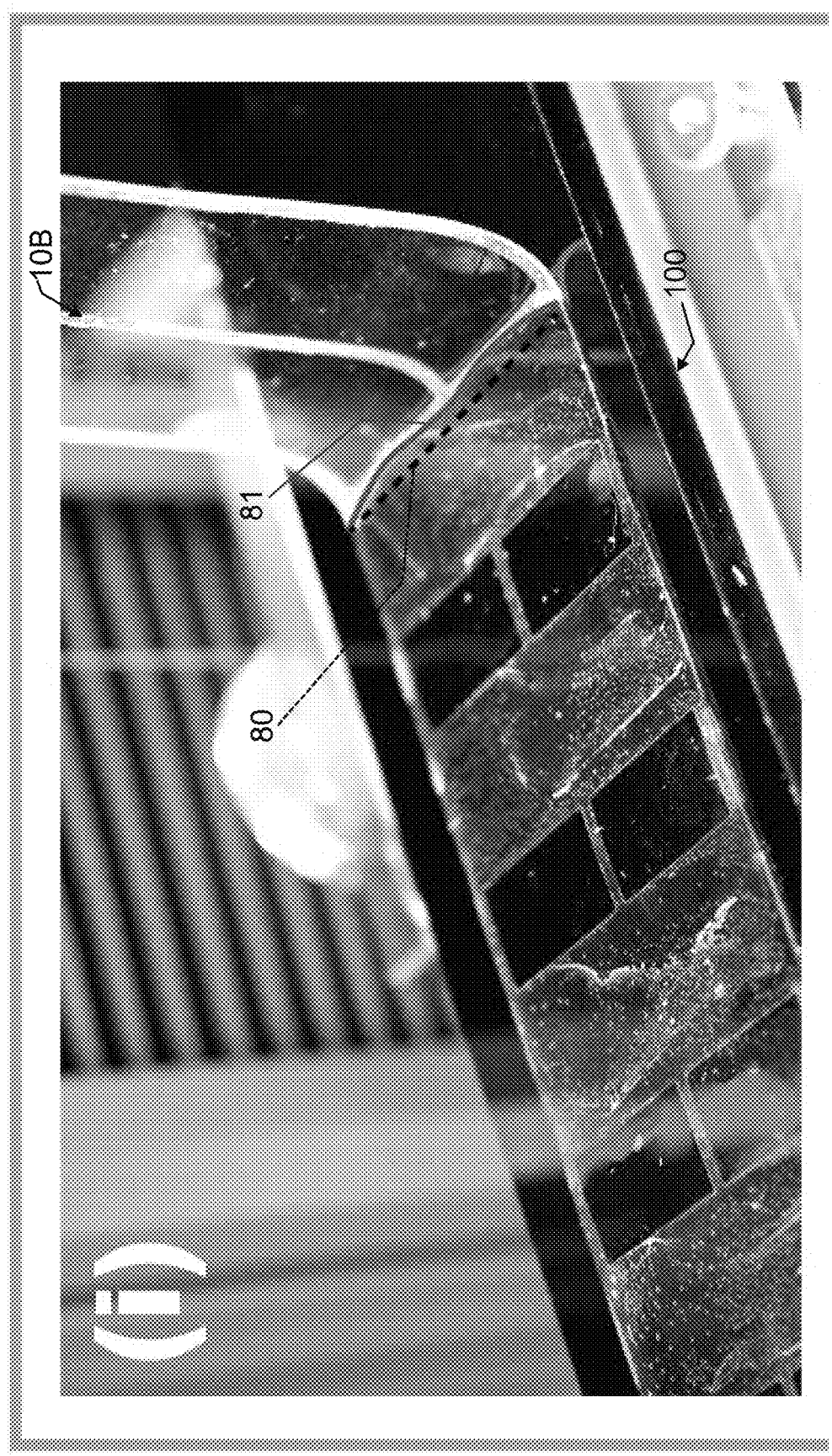
Figure 6F:
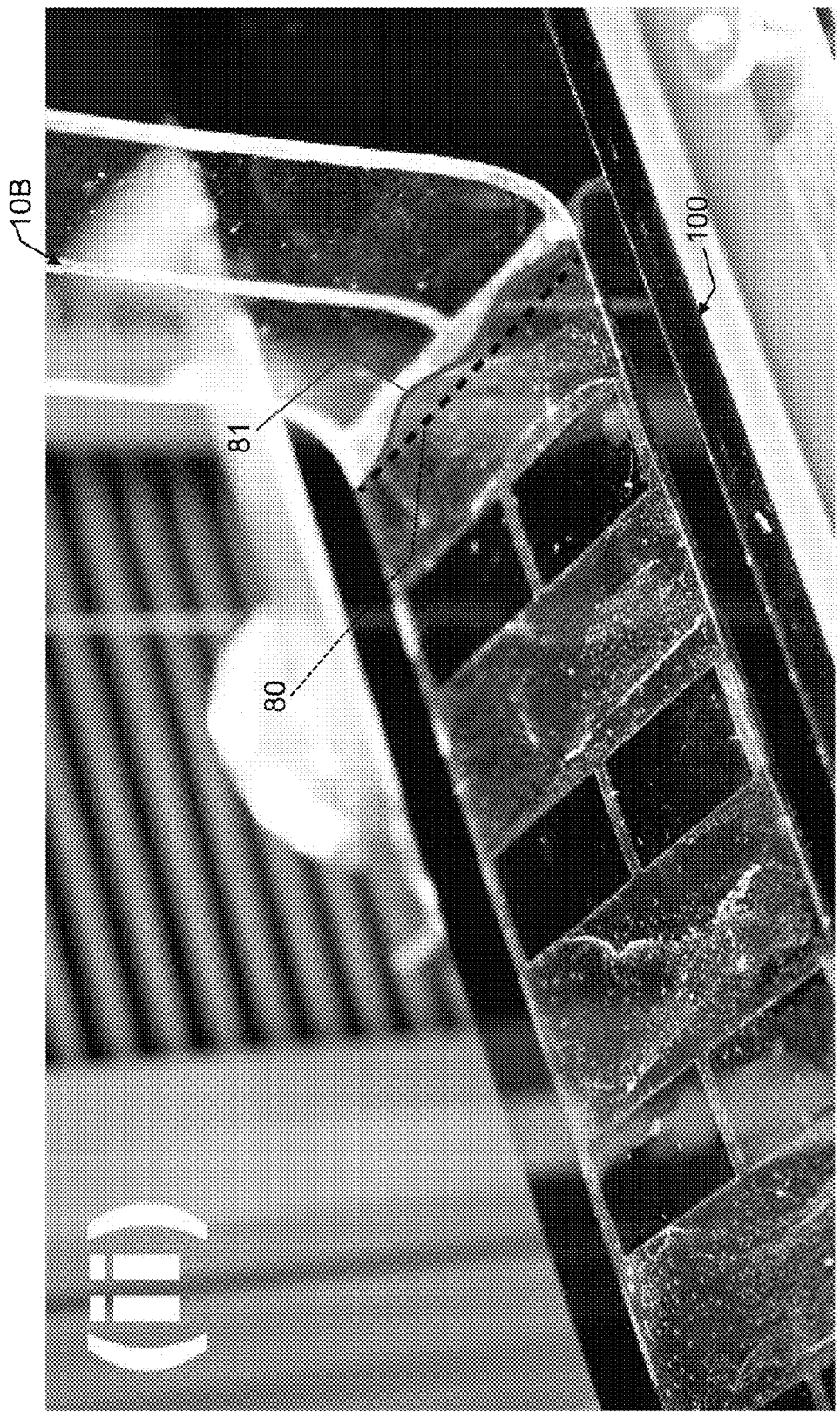
Figure 6G:
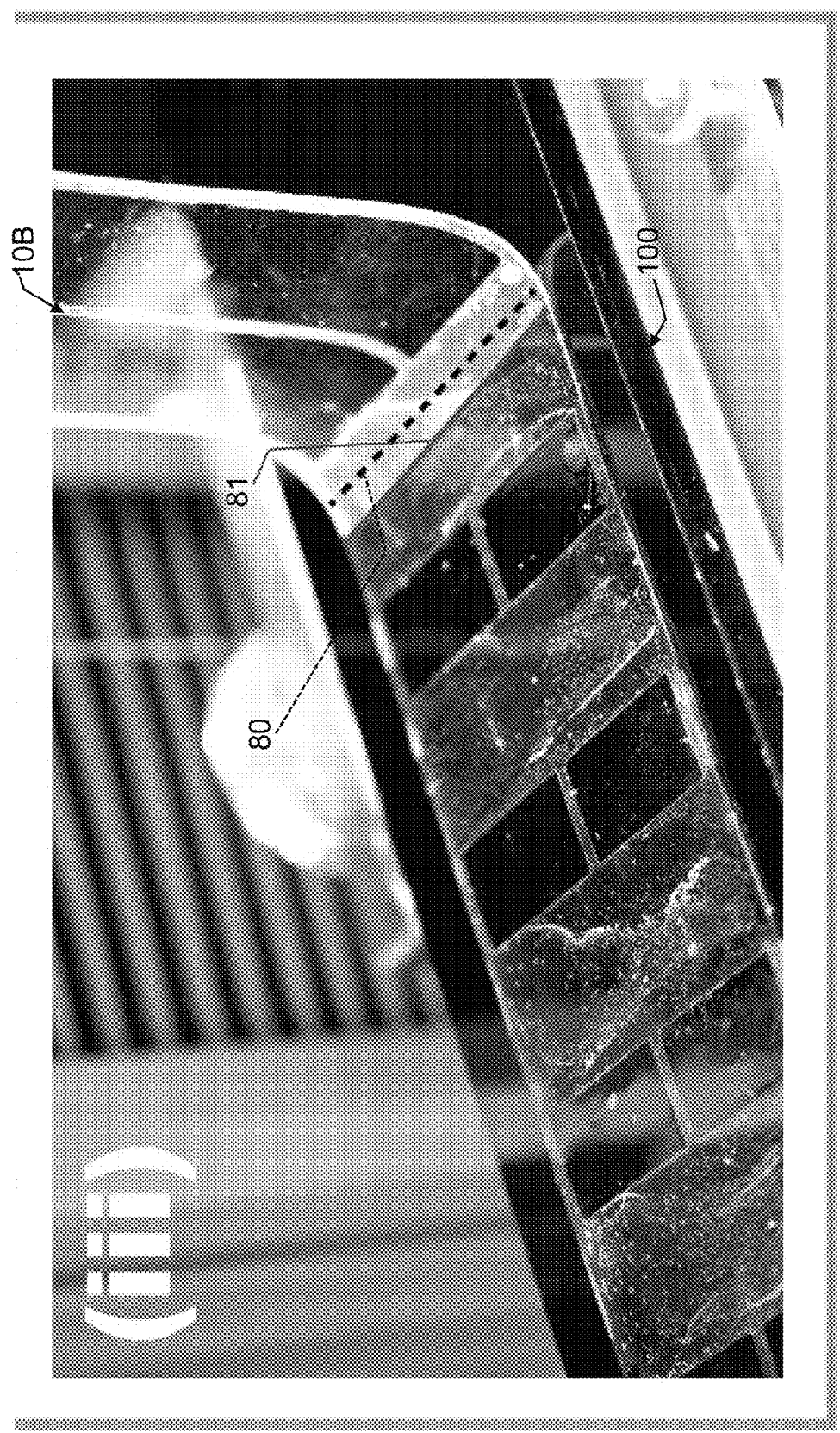
Figure 6H:
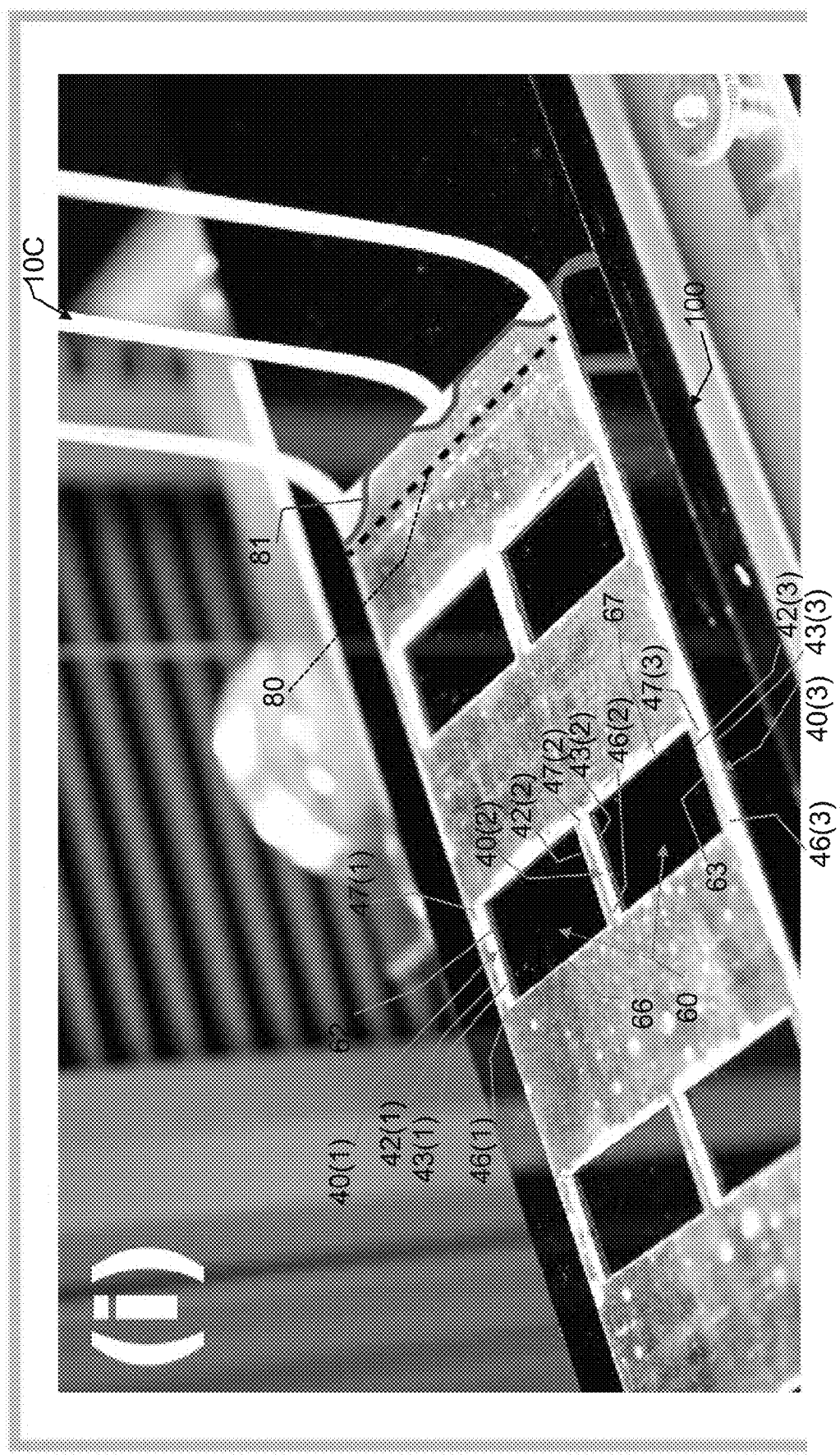
Figure 6I:
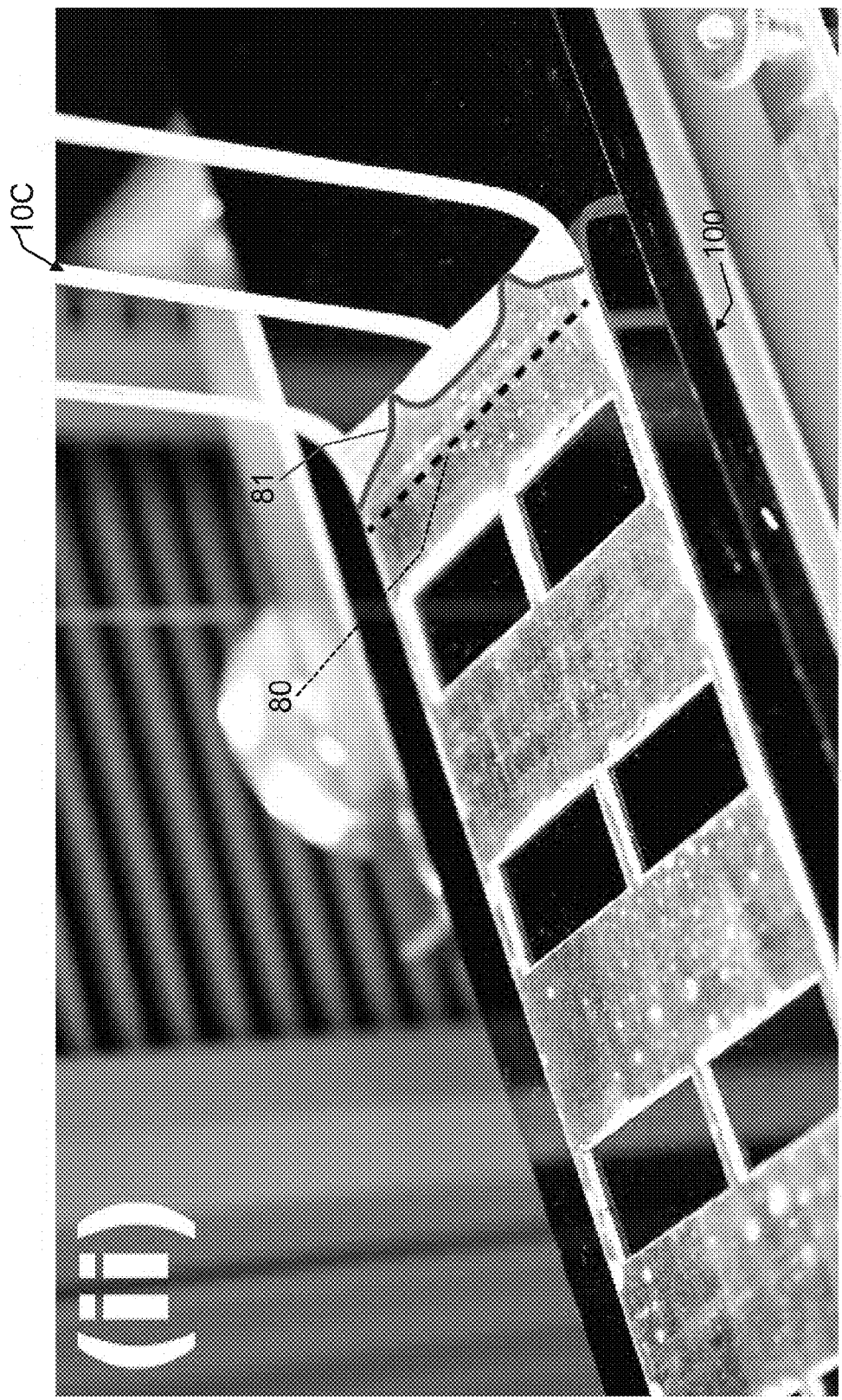
Figure 6J:
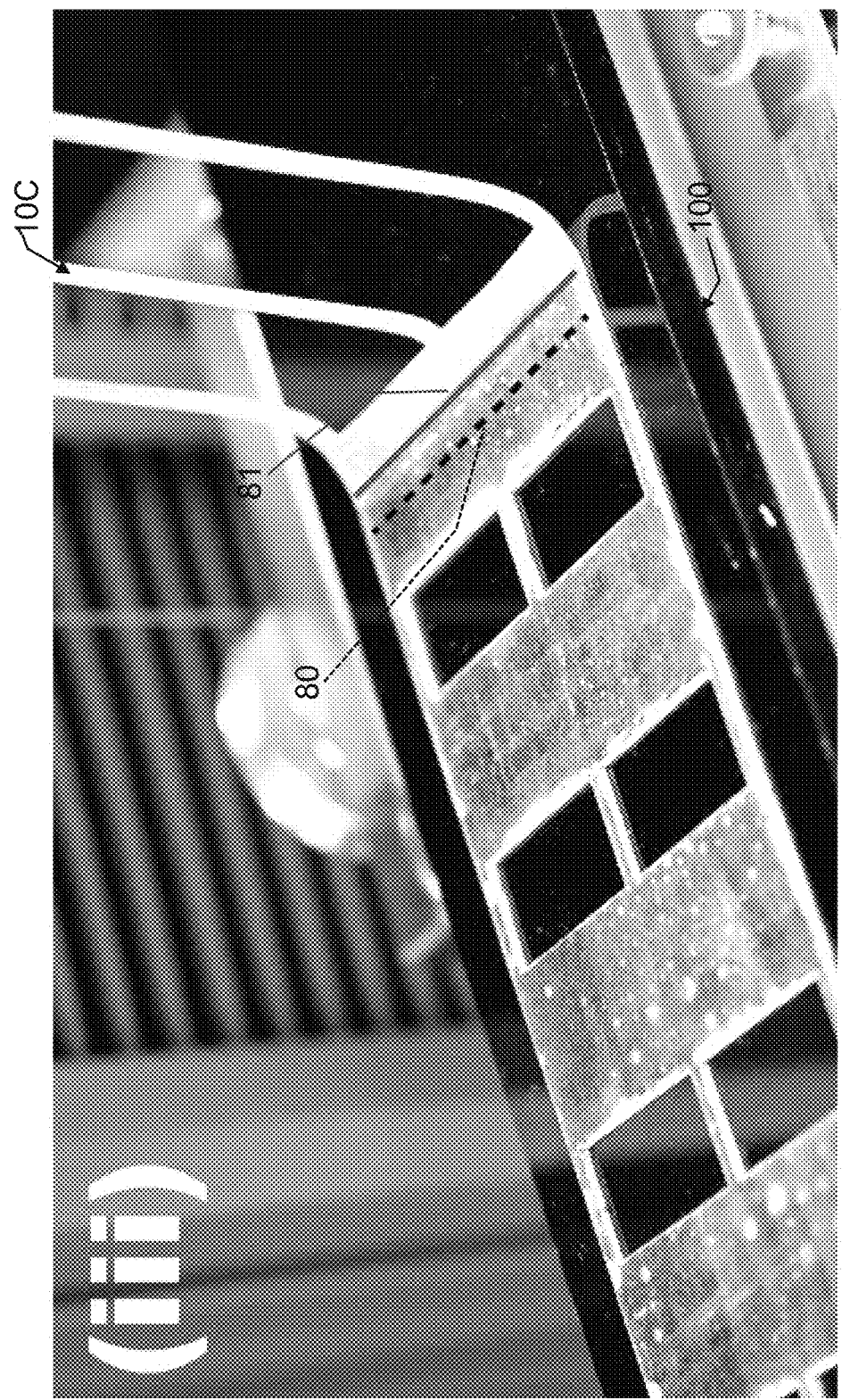

For example, FIG. 6*h* shows one example of a rectangular opening 60 with side 62, opposite side 63, what will be called leading edge 66 (the sense it is ahead in the direction of peel), and what will be called trailing edge 67 (in the sense it follows or trails a leading edge). In this example Model C (e.g. a structure 10C), FIG. 6*h* shows the example of three interconnects 40(1), 40(2), and 40(3), bridging opening 60. Each interconnect 40 has similar or identical shape/dimensions between side 42 and opposite side 43, and between leading end 46 and trailing end 47, although not required. Of course, this example is illustrative and non-limiting as to shape of opening 60, and shape and number of interconnects 40. FIGS. 6*b-j* are enlargements of individual frames of FIG. 6*a*

On the other hand, it is believed that at least some adhesive characteristics of the invention can be increased, enhanced, or optimized by increasing resolution and accuracy of those shapes and edges. The sharpness of an edge or transition between at least compliant and stiff regions can produce a larger difference in rigidity change.

Therefore, the designer has some options as to resolution of these transitions when deciding on fabrications parameters and techniques. Factors can include cost to achieve needed level of performance.

It is to be further understood that the stiff and compliant regions 30 and 20 can vary in length, width, and/or thickness from structure 10 to structure 10 or, possibly, in the same structure 10. Additionally, they can vary relative to one another. For example, stiff and compliant regions 30 and 20 do not have to be symmetric in any of its features (e.g. stiff 30 can be larger or smaller than compliant 20).

The specific example illustrates generally rectangular stiff and compliant regions 30 and 20, as well as interconnects. It is to be understood, however, that other geometries can be used and that they can differ for each of stiff regions 30, compliant regions 20, and interconnects 40. A few non-limiting examples are:

(a) triangular,
(b) circular,
(c) polygons,
(d) serpentine,
(e) fractal,
(f) hierarchical, and
(g) complex shape.

Figure 10:
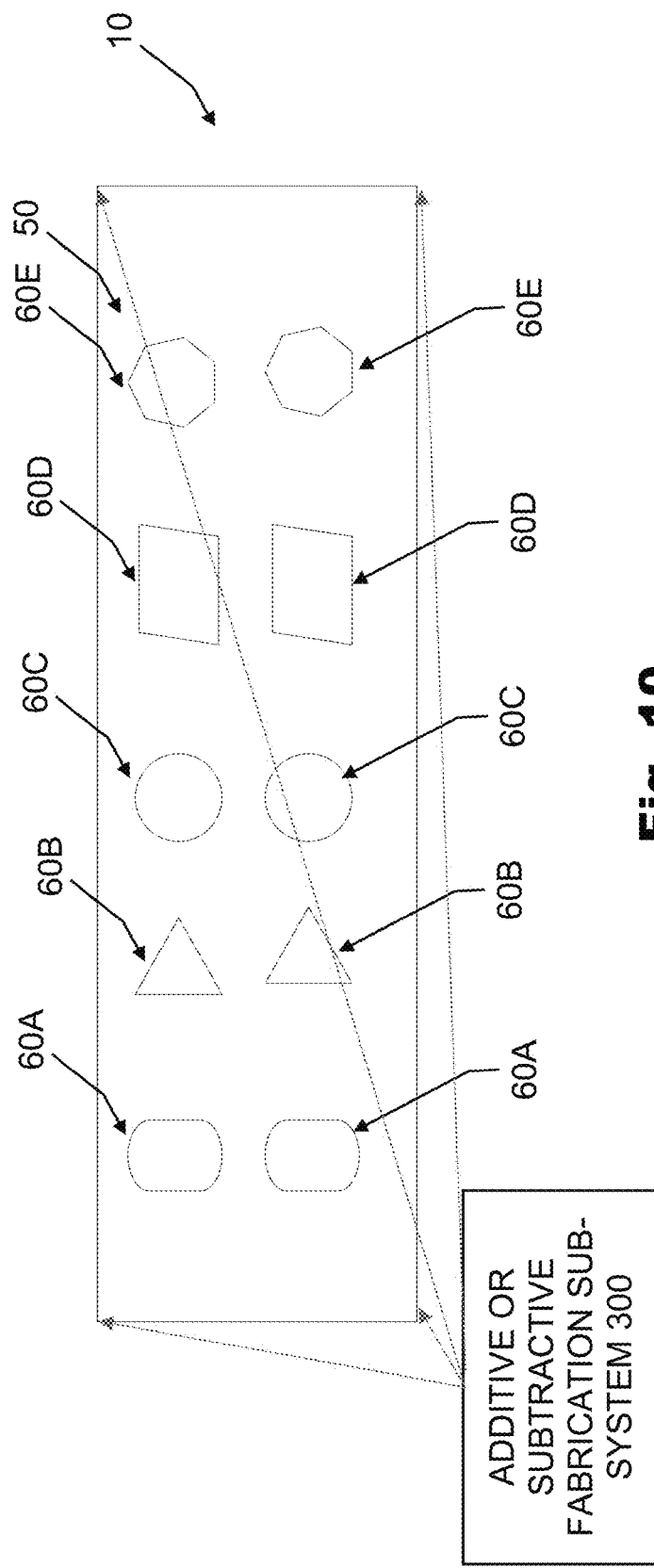
FIG. 10 is a diagrammatic illustration of a few non-limiting examples of alternative form factors for openings formed in an inelastic film or sheet to, in turn, form stiff and compliant regions for according to different embodiments of the invention.

FIG. 10 diagrammatically indicates non-limiting alternative examples of different form factors for openings 60 that could be formed in an inelastic film or sheet 50 for use in a structure 10. It also diagrammatically depicts a sub-system 300 that could be used to form any of these form factors in a pattern across a film or sheet 50, including additive or subtractive techniques as discussed herein.

Again, as a general matter, a key is that there be a change in bending rigidity from one location to the next along the structure 10 as it is peeled from a surface 100. If the at least one interconnect 40 is used, it can influence that by providing connectivity between the stiff regions 30.

Interconnects 40 can take alternative shapes to those shown in the Figures so long as they utilize principles from the specific example. A non-limiting variation is:

Interconnects could be at roughly 45 degree angles relative to the long axis Y of the final structure 10 with stiff regions 30 perpendicular to that axis.

4. Compliant Regions/Sections

The specific example discusses encapsulating a relatively rigid patterned film layer 50 with a softer/less rigid/less stiff material 70 to form the alternating more rigid or stiff regions or sections 30 and more compliant regions or sections 20 along the overall final structure 10.

As indicated above, the compliant regions or sections 20 take different forms. Models A, B, and C are several non-limiting examples.

As indicated, one material possible for the compliant regions/sections 20 is PDMS. PDMS has well-known elastic properties as well as the ability to manipulated and formed because it can change from flowable to solid state. The specific example discusses PDMS as a practical way to provide both compliant (more elastic) regions 20 between stiff (more inelastic) regions 30 as well as present an interface for mounting the overall structure 10 to a surface 100. It can be applied to a patterned layer of stiffer material 50 to provide an overall structure 10 with the periodic stiff and compliant regions 30 and 20.

Other materials 70 for the relatively compliant regions 20 are possible. A few additional non-limiting examples are:
(a) polyurethane;
(b) acrylate-based materials;
(c) block copolymer elastomer;
(d) thermal plastic elastomer;
(e) synthetic rubbers; and
(f) natural rubbers.

As a general rule, the relatively compliant material 70 should have the following characteristics:
(a) be softer than the stiff regions 30;
(b) have a durability sufficient to for typical forces (e.g. bending, strain and stress, temperature, humidity, etc.) and surfaces/environments (skin, glass, clothing, paper, walls) that will be experienced during use that is repeatable over at least a reasonable useful life;
(c) is practical for a given application (e.g. in terms of cost, availability, fabrication);
(d) can effectively present an interface at least on one side of the structure 10 for mounting to a surface 100.

Therefore, other materials that meet these types of characteristics are candidates for use. In the case of PDMS, below is a discussion of some of its specific material characteristics for reference. Other candidate materials 70 for use with the invention may or may not have all or some of these attributes, but they are intended to give context for attributes if PDMS is used.

PDMS can take different forms. Also known as dimethylpolysiloxane or dimethicone, it belongs to a group of polymeric organosilicon compounds commonly referred to as silicones. It is particularly known for its unusual rheological (or flow) and elastomer properties and, as a general matter, is:
(a) optically clear,
(b) inert,
(c) non-toxic, non-flammable.
(d) viscoelastic
(e) chemical stability
(f) shear modulus (varies with preparation conditions) typically in the range of 100 kPa to 3 MPa.
(g) Low loss tangent is very low (tan $\delta \ll 0.001$).

As is well-appreciated by those skilled in this technical area, a benefit of PDMS here is that it is viscoelastic. This can be advantageously used at the mounting interface. It can help promote reversible adhesive properties at the mounting interface. Other viscoelastic materials are possible. Elastomers are possible. But the compliant regions/sections 20 are not necessarily limited to these materials.

As will also be appreciated by those skilled in this technology art, reversible adhesive properties at the mounting interface could take different forms. One is inherent in the material of the compliant regions/sections 20. Another is some form of physical or chemical modification of the surface of the compliant material 70. A still further example is the addition of a coating or thin layer with reversible adhesive properties. For example, there are such coatings that are thin and water tolerant. Adding the same to the mounting interface could allow use of the benefits of the invention when mounting underwater. The placement of such addition coating or layer would ideally correspond with the teachings of Models A, B, or C at least substantially.

The following patents, each incorporated by reference herein, are examples of different reversible adhesive interfaces and provide additional details about the same:

U.S. Pat. No. 9,182,075, Devices for application and load bearing and method of using the same, A J Crosby, M D Bartlett, D J Irschick, D R King U.S. Pat. No. 9,395,038, Double-and multi-sided adhesive devices, A J Crosby, M D Bartlett U.S. Pat. No. 9,440,416, Weight-bearing adhesives with adjustable angles, A J Crosby, D J King, M D Bartlett, D J Irschick U.S. Pat. No. 9,574,113, High capacity easy release extended use adhesive devices, A J Crosby, M Bartlett, A B Croll, D J King U.S. Pat. No. 9,603,419, High capacity easy release extended use adhesive closure devices, A J Crosby, M D Bartlett, D J Irschick, D R King 5. Number and Placement of Interconnects As indicated, if used the number and placement of interconnects 40 can vary according to need or desire. As indicated above, at least some interconnect bridges compliant regions 20 between adjacent stiff regions 30.

The interconnects 40 can be of the same sheet or film as the rigid regions, as with the specific example above. This can be as a result of kirigami-inspired cutting of open areas 60 in a relatively inelastic or inextensible continuous sheet or film 50. The interconnects 40 and stiff regions 30 remain as a part of that continuous material 50. The interconnects 40 can range from simply margins around the open areas 60 to, alternatively or in addition, bridging across open areas between the opposite margins of the structure 10.

In a still further alternative, the interconnects 40 could be added to the structure 10. In one example, they could be affixed to adjacent stiff regions 30 after those stiff regions are laid out relative to one another (e.g. with open regions 60 between). Non-limiting examples of affixation of interconnects 40 could be some form of welding (e.g. sonic, thermal, etc.), adhesion, or mechanical fastening. The affixation should be robust enough to stay intact over the typical range of forces and environmental factors experienced by the structure 10 for a typical useful life for a given application. In the example of bandages, the technique of affixation of interconnects 40 should survive at least several bending actions during applications and then whatever bending, strain, or stress for a useful use on the patient.

The specific examples discusses some of the design factors in selecting number and coverage of interconnects 40. One interconnect 40 can work at least for many applications. Many interconnects 40 can also work. As indicated in the specific example, however, the more interconnects does not necessarily mean improvement in function or results.

The interconnects 40 could be monolithic with the stiff regions 30 (e.g. openings 60 cut in a monolithic sheet or film 50 that leave both stiff regions and interconnects). But it is to be understood they could differ from the stiff regions. For example, each interconnect 40 could be very thin in width compared to the overall width of the structure 10. In such a case, many interconnects 40 could be used. It is presently contemplated however, that total interconnect width will be less than ½ of the total stiff region width. But the invention is not limited to this. Also, thickness of interconnects 40, or shape, does not have to be the same or even similar to stiff regions 30.

As a general rule, the interconnects 40 can have the following characteristics:
  a. Bridge compliant regions 20 between adjacent stiff regions 30;
  b. Effectively operate to connect stiff regions 30;
  c. Provide load transfer across a compliant region 20.

6. Scale

As indicated, structures 10 according to the invention can take on different scales. This can include micro scale to macro scale depending on application.

For example, quite small, micro scale circuits or smart devices could be mounted to structures 10 made according to the present invention with length, width, thickness in micrometer scale(s). On the other hand, many bandages, patches, wearable devices might use structures 10 according to the invention with one or more dimensions in the centimeter range. Still further, it is envisioned that larger structures 10 could benefit from aspects of the invention. For example, patches, sheets, or the like having one or more dimensions in the tens of centimeters or even approaching meter scale are possible.

A typical range for bandages might be overall length, width, and/or thickness over ranges of 1 μm to 5 cm in length, 1 μm to 5 cm in width, and 1 μm to 1 cm in thickness. But the invention is not limited to this.

7. Applications

As indicated, the specific examples give a few non-limiting examples.

As a general rule, the invention can be applied to any application needing or benefitting from one or more features of the invention. A few non-limiting examples include:

a. Masking, packing, and other types of tape;
b. Robotic gripping;
c. Hanging objects.

Figure 11:
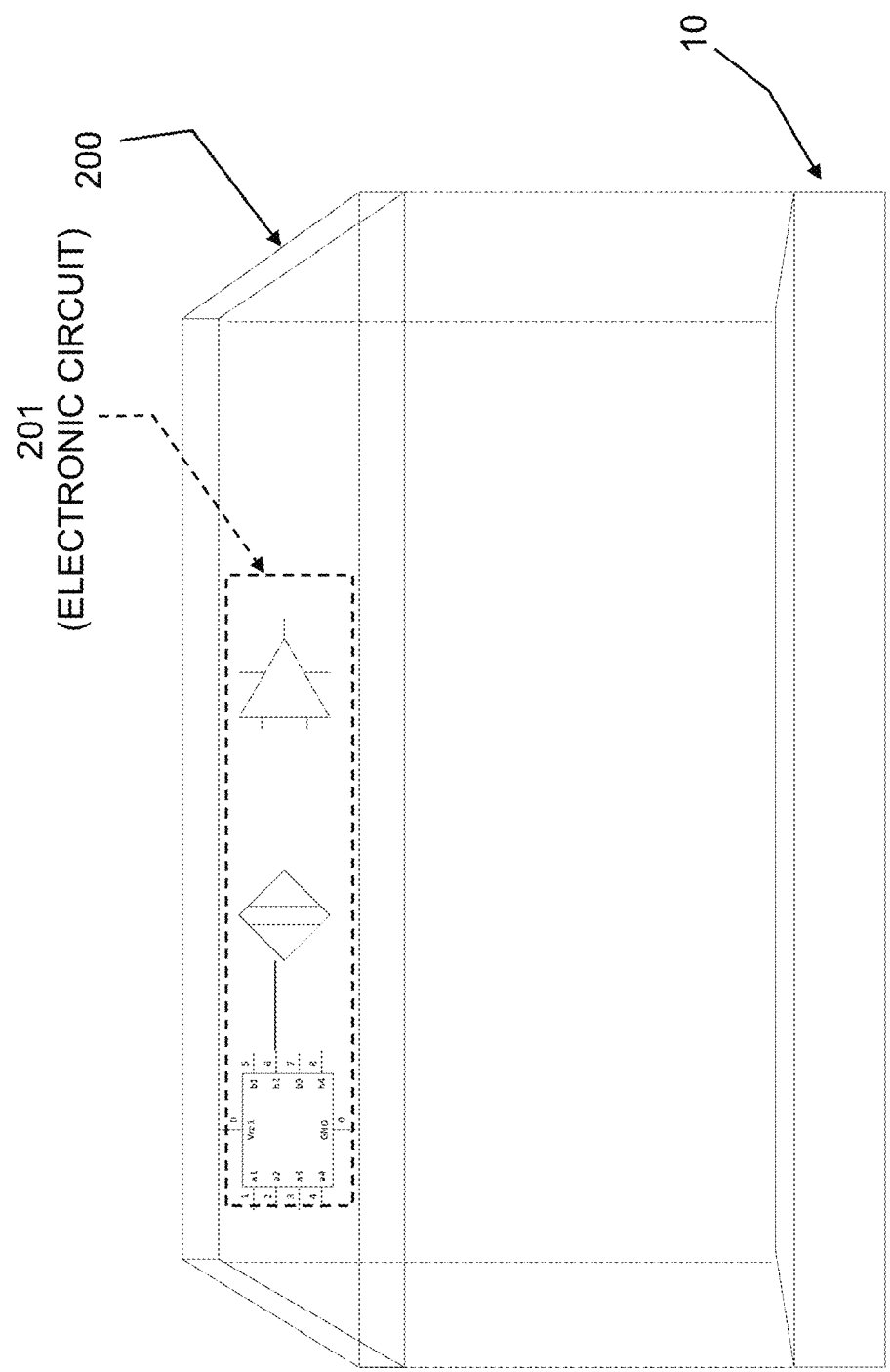
FIG. 11 is a diagrammatic illustration of addition of a functional layer to an adhesive structure according to the invention, here an electronic circuit or sensor.

FIG. 11 diagrammatically illustrates how an additional layer or addition to a structure 10 can add additional functionality to structure 10. In this non-limiting example, another thin film or sheet, or some type of applique or mounting 200 of a functionality 201 could be carried on structure 10. Some examples have been discussed above. In FIG. 11, functionality is some type of electrical or electronic circuitry. They could be wearable electronics, sensors, or other circuits. Additionally, other functionalities are possible. Non-limiting examples include one or more heating layers, anti-bacterial layers, or health related coatings. Another is for graphics (e.g. in signage).

What is claimed is:

1. An adhesive film or sheet structure having a length, width, thickness, and opposite sides for releasable adhesion to target surfaces comprising:
   a. spatially varied stiff and compliant regions formed in a continuous inextensible layer along a first direction with one or more interconnects between adjacent stiff regions; and
   b. a mounting interface with adhesive characteristics along at least the spatially varied stiff regions on at least one side of the continuous inextensible layer adapted for releasable adhesion to target surfaces;
   so that adhesion strength of the adhesive film or sheet structure and directional characteristics for release of the mounting interface of the adhesive film or sheet structure from a target surface along the first direction are enhanced by the formed spatially varied stiff and compliant regions in comparison to adhesive film or sheet structure without the formed spatially varied stiff and compliant regions.

2. The adhesive film or sheet structure of claim 1 tuned for releasable adhesion adhesive properties relative to target surfaces by one or more of:
   a. a selected periodicity of the stiff and compliant regions;
   b. a selected relative size of the stiff and compliant regions;
   c. a selected geometry of the stiff and compliant regions;
   d. a selected direction of the first direction in the continuous inextensible layer of the spatially varied stiff and compliant regions; and/or
   e. a selected actual contact width of the stiff and compliant regions and interconnects relative to a target surface.

3. The adhesive film or sheet structure of claim 1 wherein one or more of the formed spatially varied stiff and compliant regions in the continuous inextensible layer further comprises:
   a. a selected bending stiffness ratio $E_s I_s / E_c I_c$ for the stiff s and the compliant c regions, where E is elastic modulus and I is second moment of area; and/or
   b. a selected actual contact width ratio $w_s/w_c$ for the stiff s and the compliant c regions, where width w is in a transverse direction to the first direction of the spatially varied stiff and compliant regions.

4. The adhesive film or sheet structure of claim 3 wherein the continuous inextensible layer further comprises controlling of resistance to peeling anisotropy between the first direction of the spatially varied stiff and compliant regions versus the transverse direction by:
   a. a selected $l_s/l_{ch,s} \simeq 1$ to obtain enhanced crack trapping and adhesion enhancement, where $l_s$ is length of the stiff regions and $l_{ch,s}$ is a characteristic length of the stiff regions defined by:

$$l_{ch,s} = \sqrt{\frac{2E_c I_c}{w G_c}},$$

where $l_{ch}$ is a length scale comparable to the dimension of a stress field and a peel front of the adhesive film or sheet structure.

5. The adhesive film or sheet structure of claim 4 wherein, if the one or more interconnects are retained between adjacent stiff and compliant regions, the peeling anisotropy of the adhesive film or sheet structure is controlled by:
  a. a selected $l_s >= l_s / l_{ch,s}$; and
  b. a selected $w_{int} << l_{ch}$, where $w_{int}$ is an interconnect width for each of the one or more interconnects.

6. The adhesive film or sheet structure of claim 4 wherein the number of the one or more interconnects for a said compliant region comprises:
  a. at least one;
  b. two, with each at or near opposite lateral sides of the compliant region across the width of the adhesive film or sheet structure;
  c. three, with two near opposite sides of the width of the adhesive film or sheet structure; or
  d. more than three, with two near opposite sides of the width of the adhesive film or sheet structure and the remainder intermediate of the two.

7. The adhesive film or sheet structure of claim 1 wherein:
  a. the continuous inextensible layer has a rigidity characteristic and a thickness;
  b. the stiff regions are a part of the continuous inextensible layer;
  c. the compliant regions are formed by patterned cuts substantially transverse to the first direction of the spatially varied stiff and compliant regions, with either:
    i. the one or more interconnects bridging adjacent stiff regions are removed; or
    ii. the one or more interconnects bridging adjacent stiff portions are left in place; and
  d. the mounting interface comprises either:
    i. an elastic material adapted for releasable adhesion to a target surface; or
    ii. a releasable adhesive characteristic inherent in the mounting interface.

8. The adhesive film or sheet structure of claim 7 wherein the mounting interface is across substantially all of the stiff and compliant regions of one side of the continuous inextensible layer.

9. The adhesive film or sheet structure of claim 7 wherein the mounting interface encapsulates at least substantially the stiff and compliant regions of both sides of the continuous inextensible layer.

10. The adhesive film or sheet structure of claim 7 wherein the mounting interface is at substantially only the stiff regions.

11. The adhesive film or sheet structure of claim 1 wherein the mounting interface comprises at least one of:
  a. a reversible adhesive coating or thin layer; or
  b. an adhesive physical or chemical characteristic of or modification to the mounting interface that effectively creates a reversible adhesive characteristic.

12. The adhesive film or sheet structure of claim 1 wherein the rigid regions, compliant regions, and one or more interconnects bridging adjacent rigid regions are formed by subtractive fabrication of one or both of the continuous inextensible layer and the mounting interface comprising:
  a. digitally controlled laser cutting;
  b. rotary die cutting; or
  c. stamping.

13. The adhesive film or sheet structure of claim 1 wherein the rigid regions, compliant regions, and one or more interconnects bridging rigid regions are formed by additive fabrication of one or both of the continuous inextensible layer and the mounting interface comprising:
  a. digitally controlled 3D printing;
  b. digitally controlled 4D printing; or
  c. solution coating on a patterned film.

14. The adhesive film or sheet structure of claim 1 wherein the continuous inextensible layer comprises:
  a. polyethylene terephthalate (PET);
  b. polyimide;
  c. polyethylene or polypropylene;
  d. acetate film;
  e. polyvinyl chloride;
  f. paper;
  g. polylactic acid;
  h. metallized film; or
  i. fabric; and
the mounting interface comprises:
  j. polydimethylsiloxane (PDMS);
  k. polyurethane;
  l. Acrylate-based material;
  m. block copolymer elastomer;
  n. thermal plastic elastomer;
  o. synthetic rubber; or
  p. natural rubber.

15. The adhesive film or sheet structure of claim 1 wherein:
  a. the continuous inextensible layer has a thickness of 1 µm to 1 cm;
  b. each compliant region is 1 µm to 5 cm in length and 1 µm to 5 cm in width; and
  c. each stiff region is 1 µm to 5 cm in length and 1 µm to 5 cm in width;
  wherein each of the stiff and compliant regions are selectively varied in length and width within 1 µm to 5 cm to control adhesive capacity of the adhesive film or sheet structure relative to a target surface.

16. The adhesive film or sheet structure of claim 15 wherein:
  a. one or more of shape, length, and width of the stiff regions differs from shape, length, or width of the compliant regions; and
  b. one or more of shape, length, and width of the one or more interconnects differs from shape, length, or width of one or both of the stiff and compliant regions.

17. The adhesive film or sheet structure of claim 1 wherein the mounting interface has one or more of the following adhesive properties:
  a. low tack;
  b. reversibility;
  c. high force capacity; and
  d. reusability.

18. The adhesive film or sheet structure of claim 1 wherein:
  a. the geometry of the stiff regions comprises:
    i. rectangular;
    ii. triangular,
    iii. circular,
    iv. polygonal,
    v. serpentine,
    vi. fractal,
    vii. hierarchical, or
    viii. complex shape;

b. the geometry of the compliant regions comprises:
   i. rectangular;
   ii. triangular,
   iii. circular,
   iv. polygons,
   v. serpentine,
   vi. fractal,
   vii. hierarchical, or
   viii. complex shape;
c. the geometry of the interconnects comprises:
   i. rectangular;
   ii. triangular,
   iii. circular,
   iv. polygons,
   v. serpentine,
   vi. fractal,
   vii. hierarchical, or
   viii. complex shape.

19. The adhesive film or sheet structure of claim 1 configured as:
   a. a bandage;
   b. a wearable device with an electronic circuit;
   c. a tape;
   d. a surface of a robotic gripping apparatus; or
   e. a surface of a hanging object.

20. An adhesive film or sheet product having reversible adhesive properties made by the process comprising:
   a. fabricating in an inextensible sheet or film a kirigami-inspired continuous network of a series of closed portions separated by openings along an axis of the inextensible sheet or film, optionally including at least one interconnect bridging or framing a side of each opening between adjacent closed portions, the inextensible sheet or film being more inextensible than all other components of the adhesive sheet or film product; and
   b. including, before or after the fabricating the kirigami-inspired continuous network, an exposed reversible adhesive mounting interface across at least the closed portions of at least one side of the inextensible sheet or film, wherein the inextensible sheet or film and the exposed reversible adhesive mounting interface have a substantially equal overall thickness along the adhesive film or sheet product;
   to provide spatially controlled variation in bending strength at different locations along the axis of the adhesive film or sheet product for an anisotropic response to peeling along the axis.

21. The adhesive film or sheet product of claim 20 wherein the reversible adhesive properties comprises viscoelasticity.

22. The adhesive film or sheet product of claim 21 is incorporated into:
   a. a bandage;
   b. a wearable patch; or
   c. an electrical or electronic circuit.

* * * * *